United States Patent
Sood et al.

(10) Patent No.: US 11,757,650 B2
(45) Date of Patent: Sep. 12, 2023

(54) DISTRIBUTED SELF SOVEREIGN IDENTITIES FOR NETWORK FUNCTION VIRTUALIZATION

(71) Applicant: Intel Corporation, Santa Clara, CA (US)

(72) Inventors: Kapil Sood, Portland, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 16/765,686

(22) PCT Filed: Dec. 28, 2018

(86) PCT No.: PCT/US2018/067866
§ 371 (c)(1),
(2) Date: May 20, 2020

(87) PCT Pub. No.: WO2019/152119
PCT Pub. Date: Aug. 8, 2019

(65) Prior Publication Data
US 2020/0366493 A1 Nov. 19, 2020

Related U.S. Application Data

(60) Provisional application No. 62/625,177, filed on Feb. 1, 2018.

(51) Int. Cl.
*H04L 9/32* (2006.01)
*H04L 9/06* (2006.01)
(Continued)

(52) U.S. Cl.
CPC .......... *H04L 9/3239* (2013.01); *H04L 9/0643* (2013.01); *H04L 63/0272* (2013.01);
(Continued)

(58) Field of Classification Search
CPC ....... H04L 9/0643; H04L 9/3239; H04L 9/50; H04L 63/0272; H04L 63/20; H04W 12/009
See application file for complete search history.

(56) References Cited

U.S. PATENT DOCUMENTS

2017/0104847 A1   4/2017 Zhang et al.
2017/0214608 A1   7/2017 Jilani et al.
(Continued)

FOREIGN PATENT DOCUMENTS

CN   111543029   8/2020
DE   112018007007   11/2020

OTHER PUBLICATIONS

"Chinese Application Serial No. 201880083922.X, Voluntary Amendment filed May 8, 2021", w current English claims, claims not amended in voluntary amendment, 73 pgs.
"International Application Serial No. PCT/US2018/067866, International Search Report dated Apr. 9, 2019", 3 pgs.
"International Application Serial No. PCT/US2018/067866, Written Opinion dated Apr. 9, 2019", 4 pgs.
Bhamare, Deval, et al., "A survey on service function chaining", Journal of Network and Computer Applications, vol. 75, (Nov. 2016), 138-155.

(Continued)

*Primary Examiner* — Gil H. Lee
(74) *Attorney, Agent, or Firm* — Schwegman Lundberg & Woessner, P.A.

(57) ABSTRACT

Various systems and methods for distributing orchestration of network services using blockchain technology are disclosed. A bid is posted for orchestration of a network service to be delivered using NFV using a DSFC contract blockchain. The device, DSFC contract and initiator of a request for the network service are identified using a self-sovereign identity blockchain. The device determines it is to orchestrate the network service based on the DSFC contract blockchain and identifies at least one entity to provide the network service from a DWH contract blockchain that contains DWH contract bids of entities for the network service. The entities and DWH contract are identified using the self-sovereign identity blockchain. The device ensures (Continued)

that the DWH contract is being executed by the at least one entity according to the DWH contract and provides remuneration after fulfillment.

25 Claims, 12 Drawing Sheets

(51) Int. Cl.
*H04L 9/40* (2022.01)
*H04W 12/00* (2021.01)
*H04L 9/00* (2022.01)

(52) U.S. Cl.
CPC ................ *H04L 63/20* (2013.01); *H04L 9/50* (2022.05); *H04W 12/009* (2019.01)

(56) References Cited

U.S. PATENT DOCUMENTS

| | | |
|---|---|---|
| 2017/0353309 A1 | 12/2017 | Gray |
| 2019/0102850 A1* | 4/2019 | Wheeler ............. G06Q 20/405 |
| 2019/0158594 A1* | 5/2019 | Shadmon ................ H04L 67/01 |
| 2019/0158674 A1* | 5/2019 | Nelson ............. H04M 15/8038 |

OTHER PUBLICATIONS

Diebold, Zachary, "Self-Sovereign Identity using Smart contracts on the Ethereum Blockchain", Master in Computer Science, University of Dublin, Trinity College, (May 2017), 6-28.

"International Application Serial No. PCT US2018 067866, International Preliminary Report on Patentability dated Aug. 13, 2020", 6 pgs.

\* cited by examiner

DISTRIBUTED SELF SOVEREIGN IDENTITIES FOR NETWORK FUNCTION VIRTUALIZATION

PRIORITY CLAIM

This patent application is a U.S. National Stage Filing under 35 U.S.C. 371 from International Application No. PCT/US2018/067866, filed Dec. 28, 2018 and published in English as WO 2019/152119 on Aug. 8, 2019, which claims the benefit of priority to U.S. Provisional Patent Application Ser. No. 62/625,177, filed on Feb. 1, 2018, each of which is hereby incorporated by reference herein in its entirety.

TECHNICAL FIELD

Embodiments described herein generally relate to radio access networks. Some embodiments relate to Network Function Virtualization (NFV) in cellular networks, including Third Generation Partnership Project Long Term Evolution (3GPP LTE) networks and LTE advanced (LTE-A) networks as well as $4^{th}$ generation (4G) networks and $5^{th}$/next generation (5G/NG) networks. Some embodiments relate to security authentication for networks using NFV.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. As a result, LTE systems continue to develop, with the next generation wireless communication system, 5G, to improve access to information and data sharing. The 5G system looks to provide a unified network that is able to meet vastly different and sometime conflicting performance dimensions and services driven by disparate services and applications while maintaining compatibility with legacy UEs and applications.

With the vast increase in number and diversity of communication devices, the corresponding network environment, including routers, switches, bridges, gateways, firewalls, and load balancers, has become increasingly complicated, especially with the advent of 5G systems. To add complexity to the variety of services provided by the network devices, many physical implementations of the network devices are propriety and may be unable to incorporate new or adjusted physical components to compensate for different network conditions. This has led to the development of Network Function Virtualization (NFV), which may provide a virtualized environment able to provide any network function or service able to be delivered on general purpose computing systems in a data center as software applications called Virtual Network Functions (VNFs). The use of NFV may provide flexibility in configuring network elements, enabling dynamic network optimization and quicker adaptation of new technologies.

Existing service providers have started to adopt NFV as part of a Function As A Service (FaaS) model on general purpose cloud deployments. NFV, in addition to being used by existing service providers, may also reduce the barriers into telecommunications market, which has previously limited entry of new players into the technology. NFV may open features such as the supply chain, revenue creation, and procurement, among others. In other words, telecom systems evolve using NFV, which may account for, manage, and enable revenue creation for the multiple-sourced, Distributed Service Function Chaining (DSFC) components that compose the VNFs to deliver NFV Services. The unique aspect of NFV services and functions is that, unlike conventional telecom services and functions, NFV services and functions can be modified (created and eliminated) based on demand.

The advent of the 5G systems complicates matters as existing telecom system deployments have been designed for use with closed or highly controlled telecom systems. The 5G/Edge dynamic and distributed Service Delivery model is developing, causing existing deployments to be unable to scale or worse, not work, in the NFV decomposed, hyper-distributed Service Delivery model.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
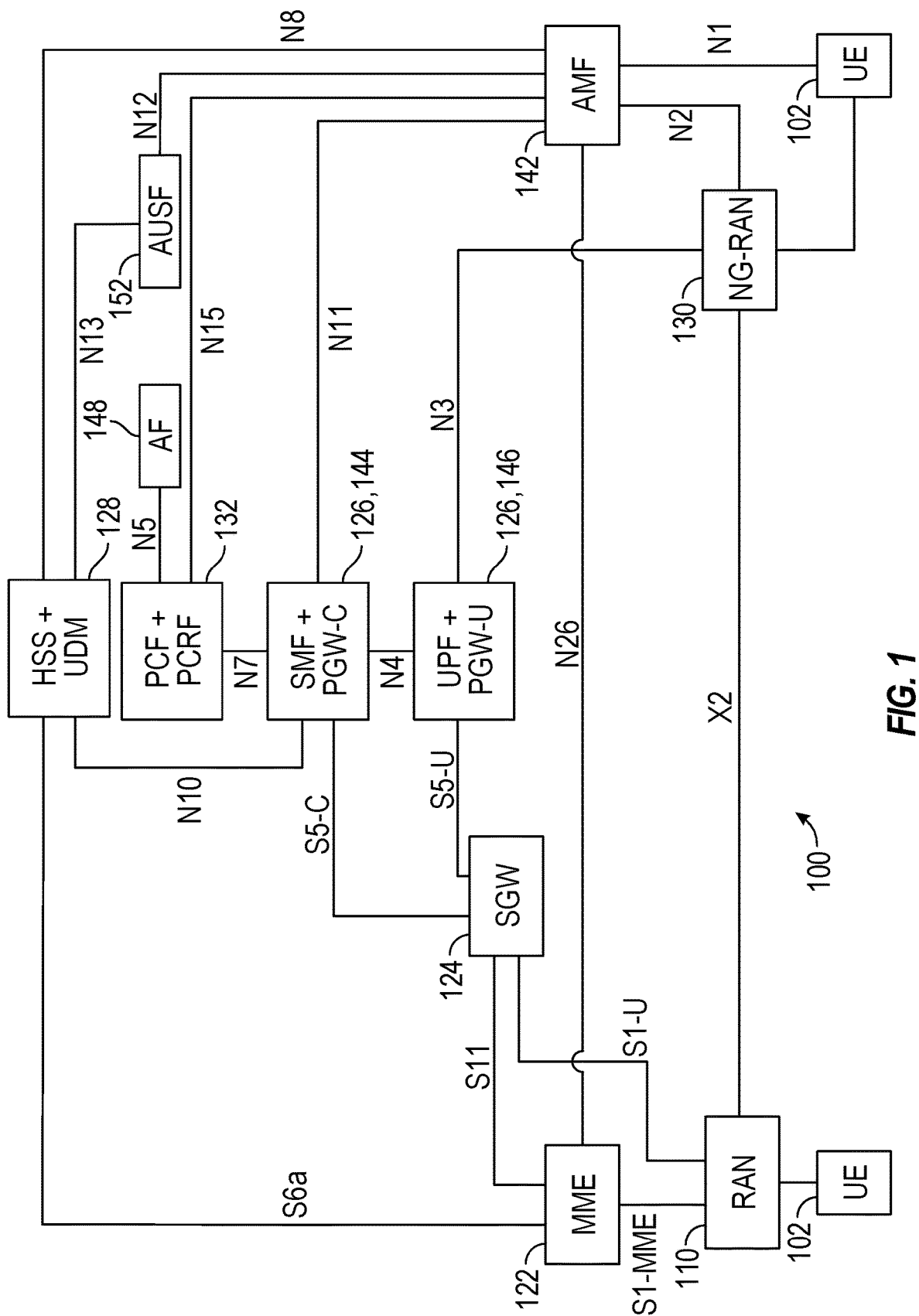
FIG. 1 illustrates a 4G and 5G system implemented by network function virtualization, according to an example.

In the following description, methods, configurations, and related apparatuses are disclosed to provide self-sovereign identities and processing operations within NFV and 5G/Edge systems through the use of blockchain technology and similar identity management tools. The use of a single identity secured by through the use of blockchain permits NFV functionality to be securely managed through the entire management lifecycle. Embodiments of a blockchain technology-based system are disclosed that can provide the underlying structure on which NFV or other telecom services and network functions can be dynamically created, delivered, and managed. This approach enables a fine granularity of management, including supply chain management at each level of the management model. The embodiments disclosed herein include, for instance, mechanisms to manage identities at each level and component of the telecom services, infrastructure and resources, enabling NFV to operate as an open business model where any entity can play any role.

As discussed herein, the following techniques may be applicable to various implementations and proposals of NFV management, such as the NFV Identity and Security Management specification promulgated by the NFV ETSI Industry Specification Group (ISG) and by the ETSI Permissioned Distributed Ledgers (PDL) ISG and by the ETSI Permissioned Distributed Ledgers (PDL) ISG. A distributed, dynamic model of service delivery is desirable in 5G systems, and the following disclosure provides techniques for managing this new infrastructure components. An automated, self-sovereign contract model may assist with many aspects of security, authentication, resource usage, and other technical issues within NFV telecommunication deployments. The applicability of the following techniques to other telecommunication service deployments and systems will also be apparent.

In an example, the NFV provider community becomes fully distributed using blockchain (distributed ledger) technology where NFV orchestration, historically centralized by management and network orchestration (MANO) systems, is distributed fairly. As disclosed herein, certain information held on a blockchain exists as a shared database or ledger. The database or ledger maintains a continuous growing list of data records or transactions, such as those used for NFV. The NFV nodes or servers maintain the blocks and every node is able to see the transaction data stored in the blocks when created. The database may thus form an immutable and irreversible record. Posts to the ledger may be unable to be revised or tampered with—not even by database operators. The distributed nature of the network means that computer servers are to reach a consensus, which allows for transactions to occur between unknown parties. Conflicting or double transactions are not written in the data set and transactions occur automatically.

In some embodiments, NFV modules may be implemented through one or more blockchain implementations. In an example, these blockchain implementations may include: a) a Self-sovereign identity blockchain; b) a distributed Service Function (SF) chain contracts blockchain; c) a Distributed Service Function Chain (DSFC) workload hosting blockchain; and d) a DSFC Workload Hosting (DWH) operations blockchain. Other uses for such blockchains will also be apparent. The blockchain may be unpermissioned or permissioned, in the latter case being based on Hyperledger frameworks or variants on Ethereum, for example.

Self-sovereign identity generally encompasses the concept that people and businesses can store their own identity data on their own devices and provide the identity data to other devices/systems to validate the identity data, without relying on a central repository of identity data. Thus, the self-sovereign identity blockchain ensures identifiers used throughout the DSFC contracting and operational phases are unique, identity ownership is retained by the requesting entity and identity disputes are able to be resolved without the use of a central authority.

A SF chain is an ordered sequence of individual service functions, such as Packet Data Network Gateways, firewalls and load balancers, that provide a service. A distributed SF chain contracts blockchain may enable any NFV provider to issue DSFC contracts that the rest of the NFV community requests (bids) to supply some or all of the contracted components. The DSFC blockchain reduces or eliminates the possibility of tampering with the contract bidding process and thus ensures that the contract bidding process is fair.

In some embodiments, a DSFC Workload Hosting (DWH) contract may be provided in response to a DSFC contract. The DSFC contract may provide specifics for the DWH contract. The DWH contract may open bidding to infrastructure providers that can host the DSFC contract. Similar to the DSFC blockchain, the DWH blockchain ensures contract bidding process is fair.

The DWH contract may result in execution of a variety of DWH operations. The DWH operations may be recorded in an associated blockchain. The DWH operations blockchain may record, for example, chain-of-custody, regulatory compliance, service level agreement (SLA) compliance, quality of service (QoS) compliance, and security compliance.

Disclosed embodiments thus use one or more blockchains or other ledgers as a distributed mechanism to manage contracts, operations, interactions, and other aspects of network functions and functionality. In an example, such distributed contracts define the requirements, functionality, controls, and parameters for operation of NFV services. In contrast, the current telecommunication system architecture relies on a central orchestration entity that maintains the customer relationship and "subcontracts" a portion of the workload in the form of virtualized network functions. The techniques disclosed herein permit removal of the central entity, replacing the central entity with a Service Contract Orchestrator role via a blockchain that any participant in the NFV ecosystem can occupy. Some of the disclosed blockchain data techniques may also be integrated with existing telecommunication system approaches (e.g., to allow new devices or participants with unique identities to be added and integrated into telecommunication services and functions).

FIG. 1 illustrates a 4G and 5G system implemented by network function virtualization, according to an example. The system 100 includes both 4G and 5G network functions. The 4G core network (also referred to as the evolved packet core—EPC) contains, protocol and reference points are defined for each entity such as a mobility management entity (MME) 122, serving gateway (S-GW) 124, and packet gateway (P-GW) 126, the last of which is split into control and user plane functionality. The 5G architecture as shown in FIG. 1 includes multiple network functions (NFs) and reference points connecting the network functions. A network function can be implemented as a discrete network element on a dedicated hardware, as a software instance running on dedicated hardware, or as a virtualized function instantiated on an appropriate platform, e.g., dedicated hardware or a cloud infrastructure.

In the 5G network, the control plane and the user plane may be separated, which may permit independent scaling and distribution of the resources of each plane. The UE 102 may be connected to either an access network or random access network (RAN) 110 and/or may be connected to the 5G-RAN 130 (gNB) or an Access and Mobility Function (AMF) 142. The RAN may be an eNB or a general non-3GPP access point, such as that for Wi-Fi. The 5G core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the 5G reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 interface. At least some of functionality of the EPC and the 5G CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The 5G CN, as above, may contain an AMF 142, SMF 144 and UPF 146, among others. The eNB 110 and gNB 130 may communicate data with the SGW 124 of the EPC 120 and the UPF 146 of the 5G CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
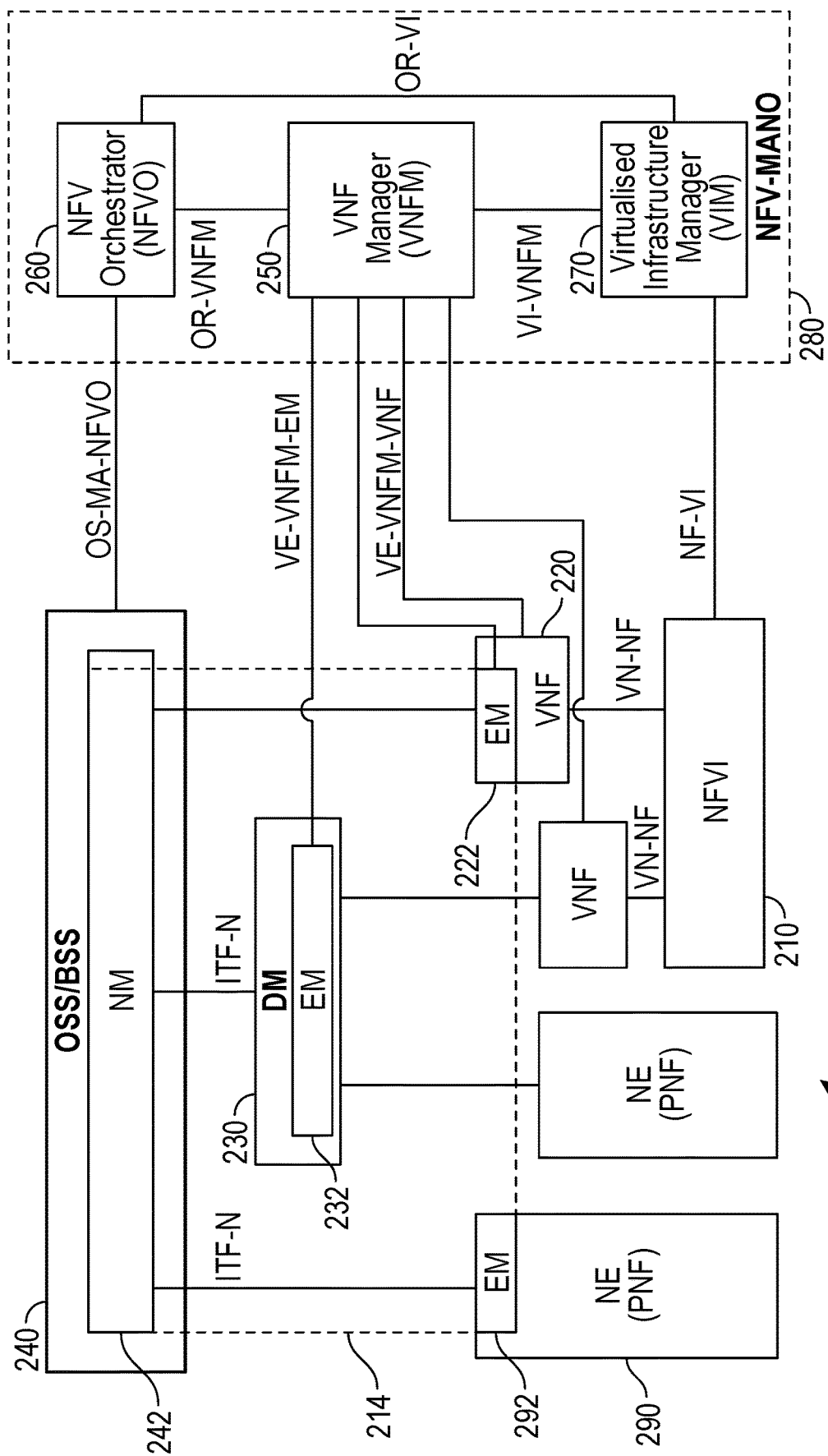
FIG. 2 illustrates a NFV network management architecture in accordance with some embodiments.

FIG. 2 illustrates a NFV network management architecture in accordance with some embodiments. As illustrated, the NFV network management architecture 200 may include a number of elements (each of which may contain physical and/or virtualized components), including a NFV Infrastructure (NFVI) 210, Network elements (NEs) 290, Virtual Network Functions (VNFs) 220, a Domain Manager (DM) 230, an Element Manager (EM) 232, a Network Manager (NM) 242, and a NFV Management and Orchestration (NFV-MANO) 280. The NFV-MANO 280, which may be replaced as indicated herein by multiple NFV-MANO, may comprise a Virtualized Infrastructure Manager (VIM) 270, a VNF Manager (VNFM) 250, and a Network Function Virtualization Orchestrator (NFVO) 260. The NM 242 may be contained in an Operations Support System/Business Support System (OSS/BSS) 240, with the DM 230 and NM 242 forming the 3GPP management system 214.

The NFV network management architecture 200 may be implemented by, for example, a data center comprising one or more servers in the cloud. The NFV network management architecture 200, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 290 may comprise physical network functions (PNF) including both hardware such as processors, antennas, amplifiers, transmit and receive chains, as well as software. The VNFs 220 may be instantiated in one or more servers. Each of the VNFs 220, DM 230 and the NEs 290 may contain an EM 222, 232, 292.

The NFV Management and Orchestration (NFV-MANO) 280 may manage the NFVI 210. The NFV-MANO 280 may orchestrate the instantiation of network services, and the allocation of resources used by the VNFs 220. The NFV-MANO 280 may, along with the OSS/BSS 240, be used by external entities to deliver various NFV business benefits. The OSS/BSS 240 may include the collection of systems and management applications that a service provider use to operate their business: management of customers, ordering, products and revenues—for example, payment or account transactions, as well as telecommunications network components and supporting processes including network component configuration, network service provisioning and fault handling. The NFV-MANO 280 may create or terminate a VNF 220, increase or decrease the VNF capacity, or update or upgrade software and/or configuration of a VNF. The NFV-MANO 280 may include a Virtualized Infrastructure Manager (VIM) 270, a VNF Manager (VNFM) 250 and a NFV Orchestrator (NFVO) 260. The NFV-MANO 280 may have access to various data repositories including network services, VNFs available, NFV instances and NFVI resources with which to determine resource allocation.

The VIM 270 may control and manage the NFVI resources via Nf-Vi reference points within the infrastructure sub-domain. The VIM 270 may further collect and forward performance measurements and events to the VNFM 250 via Vi-VNFM and to the NFVO 260 via Or-Vi reference points. The NFVO 260 may be responsible for managing new VNFs and other network services, including lifecycle management of different network services, which may include VNF instances, global resource management, validation and authorization of NFVI resource requests and policy management for various network services. The NFVO 260 may coordinate VNFs 220 as part of network services that jointly realize a more complex function, including joint instantiation and configuration, configuring required connections between different VNFs 220, and managing dynamic changes of the configuration. The NFVO 260 may provide this orchestration through an OS-Ma-NFVO reference point with the NM 242. The VNFM 250 may orchestrate NFVI resources via the VIM 270 and provide overall coordination and adaptation for configuration and event reporting between the VIM 270 and the EMs and NMs. The former may involve discovering available services, managing virtualized resource availability/allocation/ release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 250 may be responsible for the lifecycle management of the VNFs 220 via the Ve-VNFM-VNF reference point and may interface to EMs 222, 232 through the Ve-VNFM-EM reference point. The VNFM 250 may be assigned the management of a single VNF 220, or the management of multiple VNFs 220 of the same type or of different types. Thus, although only one VNFM 250 is shown in FIG. 2, different VNFMs 250 may be associated with the different VNFs 220 for performance measurement and other responsibilities. The VNFM 250 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 270 may be responsible for controlling and managing the NFVI compute, storage and network resources, usually within one operator's Infrastructure Domain. The VIM 270 may be specialized in handling a certain type of NFVI resource (e.g. compute-only, storage-only, networking-only), or may be capable of managing multiple types of NFVI resources. The VIM 270 may, among others, orchestrate the allocation/upgrade/release/ reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NVFI 210 may itself contain various virtualized and non-virtualized resources. These may include a plurality of virtual machines (VMs) 212 that may provide computational abilities (CPU), one or more memories 214 that may provide storage at either block or file-system level and one or more networking elements 216 that may include networks, subnets, ports, addresses, links and forwarding rules to ensure intra- and inter-VNF connectivity.

Each VNF 220 may provide a network function that is decoupled from infrastructure resources (computational resources, networking resources, memory) used to provide the network function. Although not shown, the VNFs 220 can be chained with other VNFs 220 and/or other physical network function to realize a network service. The virtualized resources may provide the VNFs 220 with desired resources. Resource allocation in the NFVI 210 may simultaneously meet numerous requirements and constraints, such as low latency or high bandwidth links to other communication endpoints.

The VNFs 220, like the NEs 290 may be managed by one or more EMs 222, 232, 292. The EM may provide functions for management of virtual or physical network elements, depending on the instantiation. The EM may manage individual network elements and network elements of a subnetwork, which may include relations between the network elements. For example, the EM 222 of a VNF 220 may be responsible for configuration for the network functions provided by a VNF 220, fault management for the network functions provided by the VNF 220, accounting for the usage of VNF functions, and collecting performance measurement results for the functions provided by the VNF 220.

The EMs 222, 232, 292 (whether in a VNF 220 or NE 290) may be managed by the NM 242 of the OSS/BSS 240 through Itf-N reference points. The NM 242 may provide functions with the responsibility for the management of a network, mainly as supported by the EM 232 but may also involve direct access to the network elements. The NM 242 may connect and disconnect VNF external interfaces to physical network function interfaces at the request of the NFVO 260.

As above, the various components of the system may be connected through different reference points. The references points between the NFV-MANO 280 and the functional blocks of the system may include an Os-Ma-NFVO between the NM 242 and NFVO 260, a Ve-VNFM-EM between the EM 222, 232 and the VNFM 250, a Ve-VNFM-VNF between a VNF 220 and the VNFM 250, a Nf-Vi between the NFVI 210 and the VIM 270, an Or-VNFM between the NFVO 260 and the VNFM 250, an Or-Vi between the NFVO 260 and the VIM 270, and a Vi-VNFM between the VIM 270 and the VNFM 250. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Ve-Vnfm interface may implement a virtualized resource performance/fault management on the Ve-Vnfm reference point.

Figure 3:
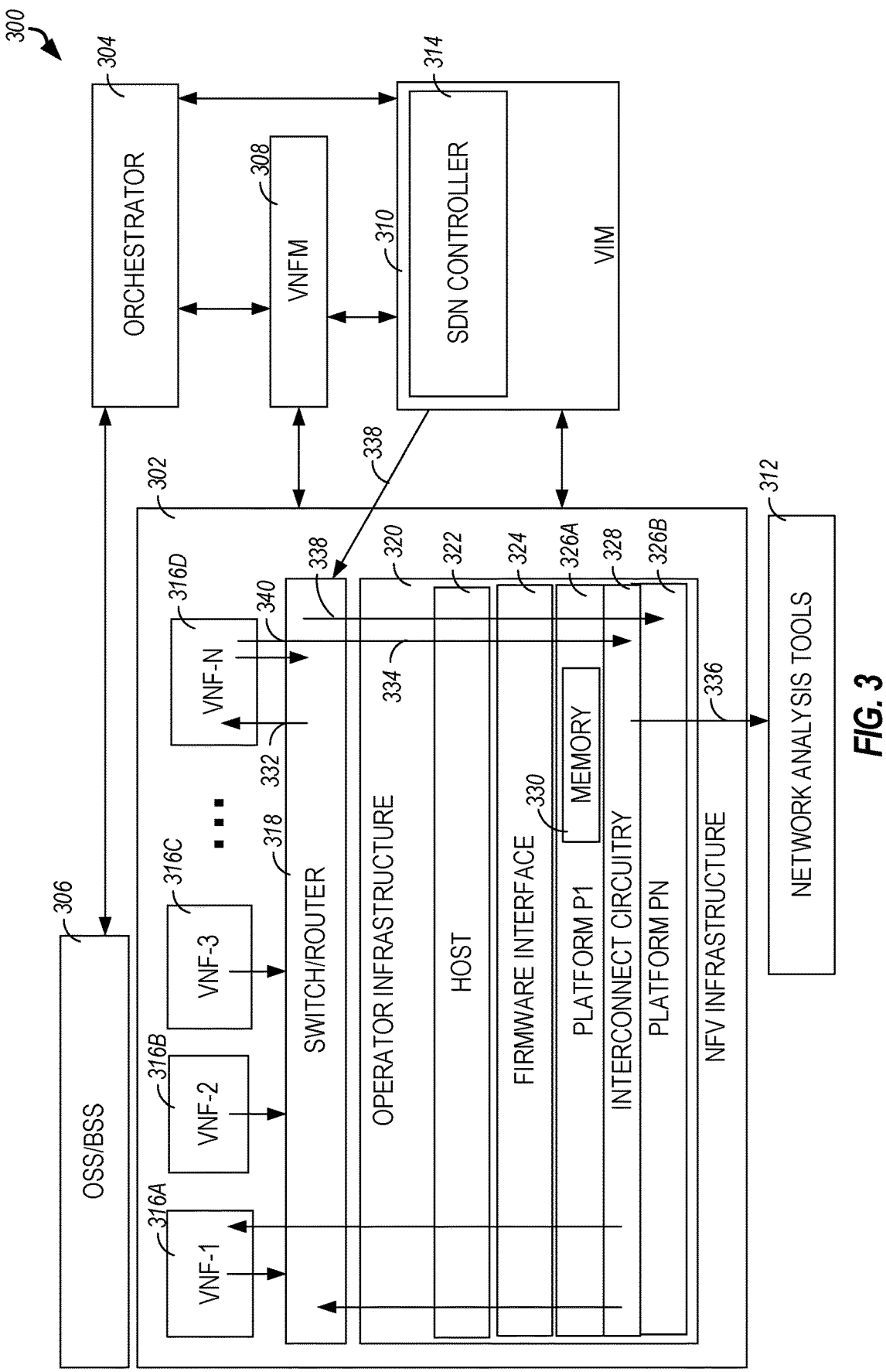
FIG. 3 illustrates a system for implementing network function virtualization, according to an example.

FIG. 3 illustrates an example of a system for implementing network function virtualization. The system 300 provides an alternate view of the system shown in FIG. 2. In some embodiments, only software mechanisms are used. It will be understood that the system 300 is provided for example illustration of the capabilities and forms that an NFV deployment may take, and that many variations to the structure and function of NFV systems may be used with the present disclosure.

The system 300 as illustrated includes an NFV infrastructure 302, an orchestrator (NFVO) 304, an OSS/business support system (BSS) 306, a VNFM 308, a VIM 310, and network analysis tools 312. Fewer or additional components may be integrated into system 300.

The NFV infrastructure 302 virtualizes network node functions that may be chained together to create, for example, communication services. The NFV infrastructure 302 as illustrated includes VNFs 316A, 316B, 316C, and 316D, a switch/router 318, and an operator infrastructure 320.

VNFs 316A-316D are virtualized tasks formerly carried out by dedicated hardware. The VNFs 316A-316D move these operations previously performed by the dedicated hardware to software instantiations. The VNFs 316A-316D operate by virtue of the hardware and/or software programming of the host 322.

The switch/router 318 provides communication capability between platforms 326A-326B and/or VNFs 316A-316D. A switch may be used to connect computers or other network devices. A router may be used to connect networks together, such as by connecting a network to the internet. The router may generally manage a path of data (e.g., a request, message, or a response, among others) provided to another network or between devices within a network.

The operator infrastructure 320, for instance, may host other operators' VNFs and includes the host 322 (e.g., operating system (OS), cloud OS, and/or hypervisor), a firmware interface 324 (e.g., a unified extensible firmware interface (UEFI) or basic input/output system (BIOS)), a plurality of platforms 326A and 326B (for example), and interconnect circuitry 328 (e.g., input/output (I/O) ports, network interface controller (NIC), switch, host fabric interface (HFI), or the like).

The host 322 can include hardware or software for providing resources used by the VNFs 316A-316D for performing their operations. The host 322 can include an OS, cloud OS, hypervisor, or the like on which the VNFs 316A-316D can operate. The firmware interface 324 can include a Unified Extensible Firmware Interface (UEFI), Basic Input/Output System (BIOS), or the like. The firmware interface 324 defines a software interface between the host 322 and the firmware (e.g., the VNF 316A-316D).

The platform 326A-326B provides communication functionality for devices connected to a communication network. Examples of user functionality provided by the platform 326A-326B include voice sessions (such as voice over internet protocol (VoIP), PTT sessions, group communication sessions) and data services such as internet access and social networking services, and operations for supporting the voice and internet access, among others. The platform 326A includes memory 330 (as does platform 326B, but the storage is not shown in order not to obscure the view of the system 300). The platforms 326A-326B may be communicatively coupled by interconnect circuitry 328.

The NFVO 304 performs resource and/or network service orchestration. The NFVO 304 binds functions provided by the VNFs 316A-316D, such as to create a service in an otherwise dispersed NFV environment. The NFVO 304 can help ensure that adequate compute, storage, and/or other network resources are available to provide a network service. The NFVO 304 can authorize, coordinate, release, and govern VNFs 316A-316D sharing resources of the infrastructure 302.

In an example, the OSS/BSS 306 are computer systems used by telecom service providers to manage their networks. The OSS/BSS 306 can support network inventory, configuration, fault management, and/or service provisioning.

The VNFM 308 works with the NFVO 304 and VIM 310 to provide VNF capability. The VNFM 308 may instantiate VNFs 316A-316D, scale VNFs 316A-316D, update and/or upgrade the VNFs 316A-316D, and/or terminate VNFs 316A-316D. The VNFM 308 can manage a single VNF or multiple VNFs. The VNFM 308 maintains the virtualized resources that support the VNF 316A-316D.

The VIM 310 as illustrated includes a software-defined networking (SDN) controller 314. The VIM 310 controls and manages compute, storage, and other network resources of the infrastructure 302. The VIM 310 can handle infrastructure in one or a plurality of infrastructures, such as can include the infrastructure 302. The VIM 310 can maintain a list of which virtual resources are allocated which physical resources, manage security group policies (for access control), manage a repository of NFV hardware resources and software resources, such as to help improve and optimize the use of system resources.

The SDN controller 314 is an application that manages flow control, such as within networks. The SDN controller 314 allows a server or other network resource to select a switched packet destination, indicating to a switch where to send a packet. The SDN controller 314 can take a control plane of network hardware and runs it as software. The SDN controller 314 can distribute monitoring policies.

The network analysis tools 312 can provide functionality for analyzing telemetry data, such as NSM functionality. The network analysis tools 312 can include the virtual EPC (vEPC), virtual customer-premises equipment (vCPE) NFV analytics, data storage, network anomaly detection, and/or malware detection, or the like.

Network security monitoring (NSM) traffic is indicated by arrows 332, 334, 336, and 338. The flow of this NSM traffic may be "accelerated" by embodiments discussed herein. The SDN controller 314 of the VIM 310 may provide a policy to the VNF 316D (e.g., a security monitoring (SecMon) VNF), as indicated by a combination of arrows 338 and 332. Traffic provided to the VNF 316D may be securely terminated. The VNF 316D can monitor traffic (e.g., all traffic) on the switch/router 318 (as indicated by arrow 332). The VNF 316D can apply a provided monitoring policy to the traffic. The VNF 316D provides, based on the monitoring policy, monitored traffic to the interconnect circuitry 328 (as indicated by the arrow 334 or the arrows 340 and 338). The interconnect circuitry 328 provides the monitored traffic to network analysis tools 312, as indicated by arrow 336. The network analysis tools 312 may include security and networking analytics systems, meta data collectors, network profiling, per-tenant and/or per-flow monitoring systems, and/or onto tenant monitoring systems.

The following techniques may be used to decentralize the NFV infrastructure for supplying network services through function virtualization, and through the management of the NFV operations. In an example, four blockchains (or at least a single blockchain with four distinct operational functions) may be used to facilitate safe, fair and reliable interactions between ecosystem participants.

Figure 4:
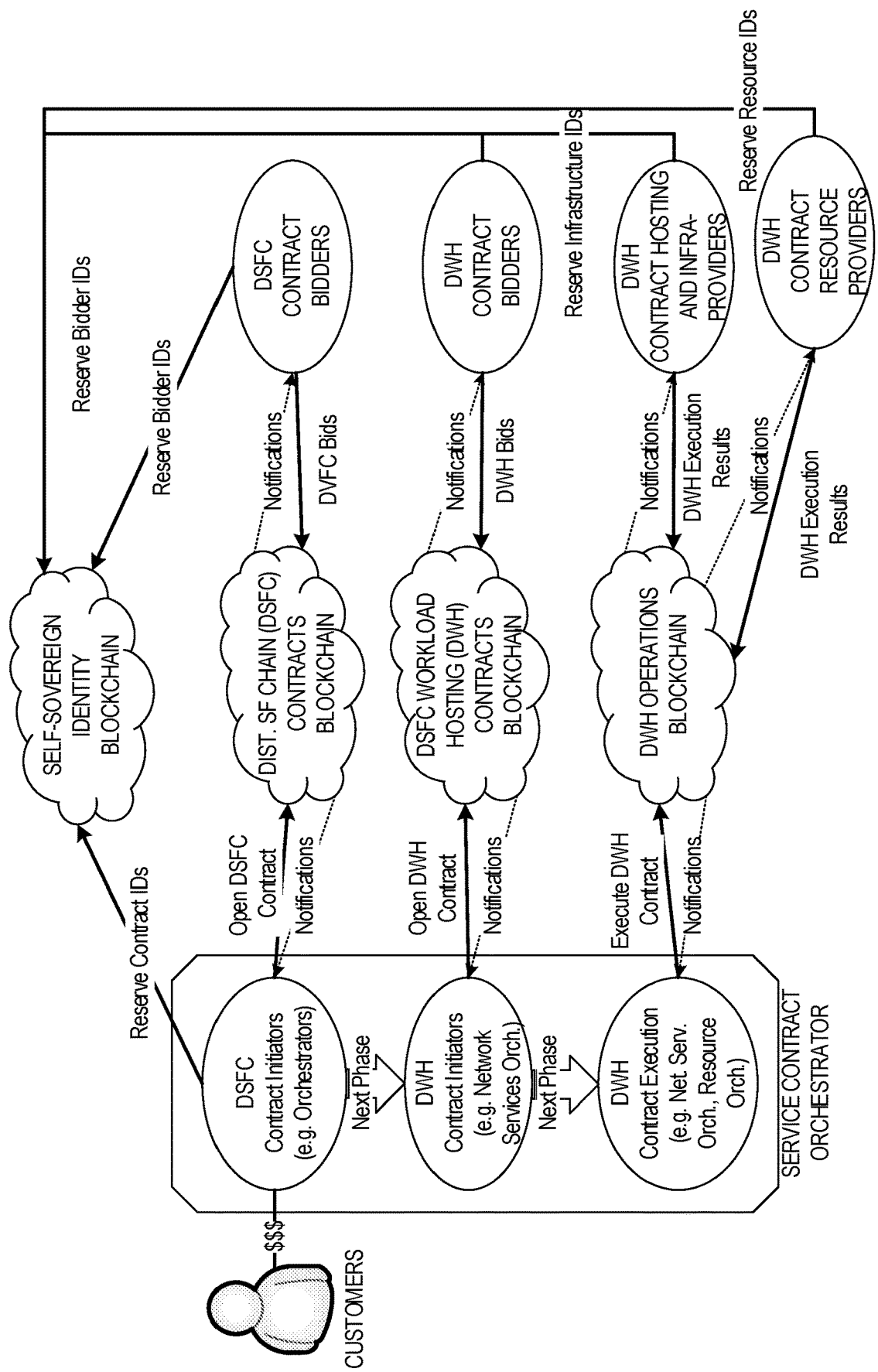
FIG. 4 illustrates a blockchain model for enabling a distributed system of self-sovereign identities in a network function virtualization environment, according to an example.

FIG. 4 illustrates a blockchain model for enabling a distributed system of self-sovereign identities in a network function virtualization environment. As above, DSFC is used to capture the specifics of the type and quality of service desired by the DSFC contract initiator, which then associates the DSFC with a blockchain identity. The blockchain identity may be a DSFC contract blockchain. The DSFC contract may have a unique ID that is provided to a self-sovereign identity blockchain. In some embodiments, the DSFC may be captured in the form of an e-contract.

The DSFC contract may be disseminated via broadcast notification to vendors (or service provider entities), may be transmitted directly only to those vendors who have opted in to receiving notifications of a new DSFC or a DSFC with certain type/QoS or may be posted to allow any vendor to determine whether or not it wishes to engage in a particular DSFC contract.

In some embodiments, any vendor that maintains an end-user customer base can initiate bids for DSFC contract by posting bids to the DSFC blockchain. The bids may include a bidder ID, which is also provided to the self-sovereign identity blockchain and eventually associated with the DSFC contract ID if accepted. DSFC contracts may be bid upon by service provider entities that can fulfill at least some portion (or all) of the contract.

The DSFC contract initiator selects the vendor(s) that will fulfill the DSFC contract by using the DSFC contract blockchain. The selection may be based on purely remunerative measures by the vendor(s), randomly among the vendor(s), based on the fewest number of vendor(s) to fulfill the DSFC contract or by a predetermined prioritization among the vendor(s), among others.

As shown, in some embodiments, the DSFC e-contracts, initiators, and bidders use the self-sovereign identity blockchain to issue identifiers to the selected participants in a manner such that potential disputation regarding service definition, terms, conditions, providers and anything that requires disambiguated identity can be established with clear precedence (in time) and with secure (non-spoofable) chain-of-custody evidence.

The second phase of the distributed NFV is the DWH contract negotiation. During the DWH contract negotiation, the previous phase contract (that defines the service to be delivered) is matched to a service delivery infrastructure that can meet hosting requirements. The second round of DWH contracts is again open to all bidders, including those that may have participated in winning the DSFC contract. The contract initiator selects the team that will satisfy the DWH contract to its satisfaction as the final step to a blockchain e-contract execution plan.

The third phase is DWH execution where the DWH and DSFC contract become operational. During operation, telemetry data are collected that report on actual service delivery experience (for example, the variance with which SLAs were satisfied). The Service Contract Orchestrator verifies the DWH contract executes according to contract and that participants are paid accordingly from Customer e-wallets.

Figure 5:
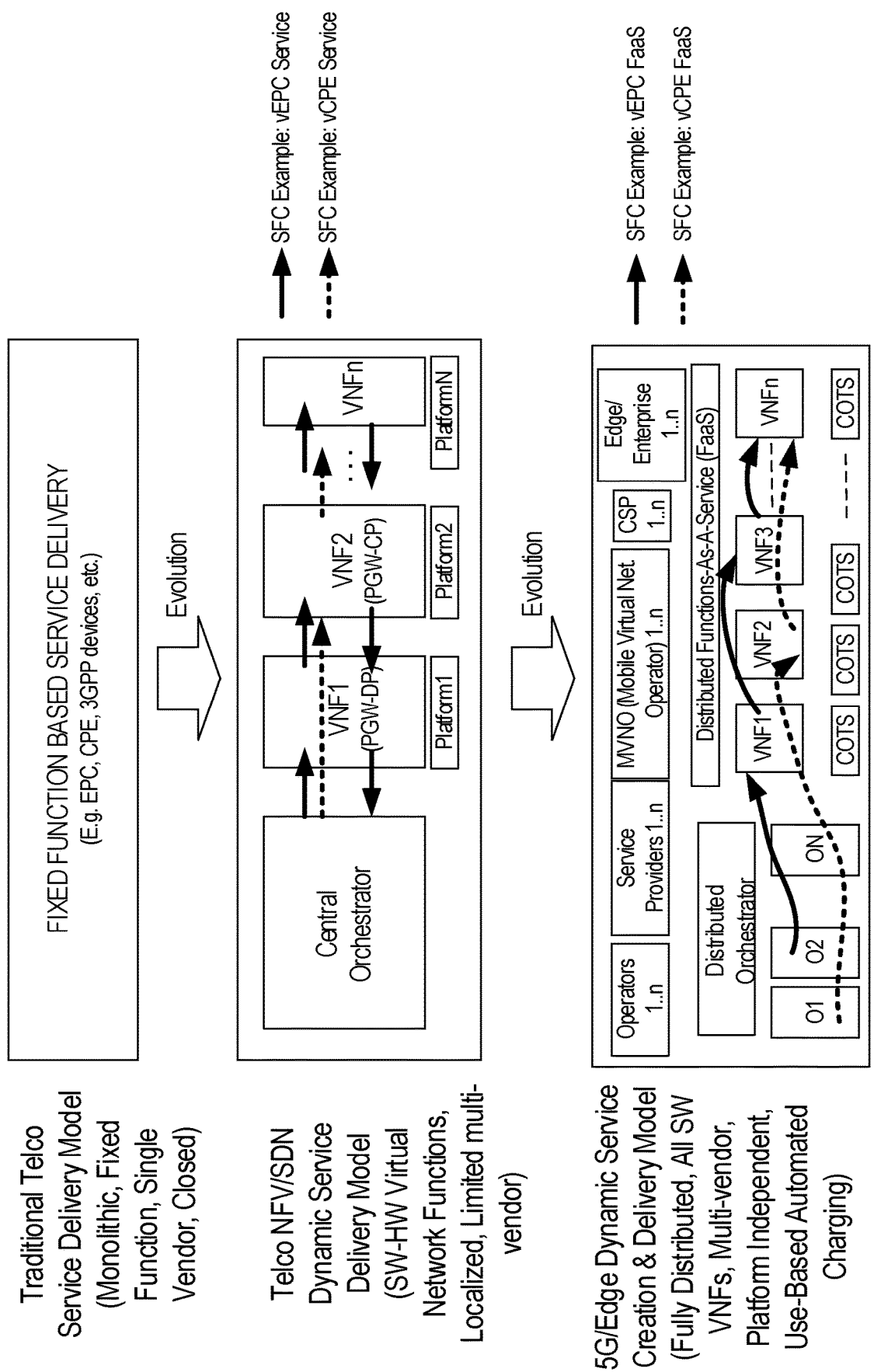
FIG. 5 illustrates an evolution context for telecommunication approaches, progressing to network function virtualization, according to an example.

FIG. 5 illustrates an evolution context for telecommunication approaches, progressing to network function virtualization. The NFV ecosystem is complex having many components and subsystems. It is an ecosystem that is already on a path toward a more open marketplace having been dominated by a few telco players for many years.

The three phases of NFV evolution are shown in FIG. 5. The first phase is essentially a closed system. The second phase allows portions of the network function virtualization stack to be opened to VNF providers who compete with each other to provide a better "function" but where "functions" are orchestrated centrally—usually by a telco provider.

The third phase makes orchestration distributed as well. With this change, any NFV ecosystem player can vie to supply any or all of the components and services.

Figure 6:
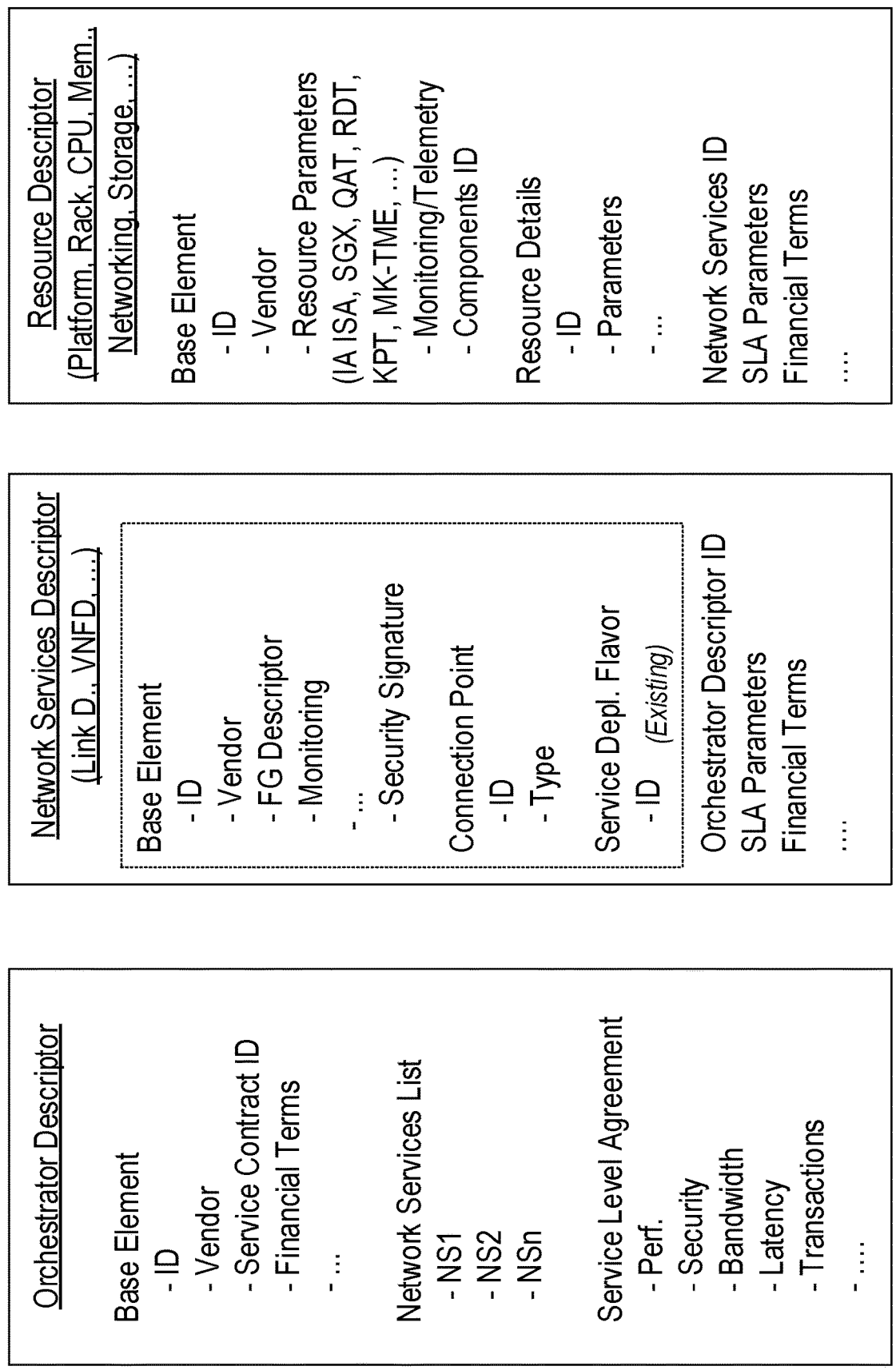
FIG. 6 illustrates various types of descriptors used for network function virtualization in a distributed system of self-sovereign identities, according to an example.

FIG. 6 illustrates various types of descriptors used for network function virtualization in a distributed system of self-sovereign identities. In an example, new NFV descriptors (added to the existing set of network services descriptors) are used for extending contracts (e.g. NFV Descriptors) for the fully distributed blockchain.

This listing of descriptors shows the sample contract structures that may be implemented at each of the layers in the process. Current ETSI NFV standards (e.g., the ETSI NFV MANO001 spec) describes the various existing descriptors (which are data structures containing parameters) for existing services. At least some of the descriptors may be delivered within ETSI NFV-defined protocols, as well as the extensions indicated herein.

With the present configuration, additional contracts and extensions may be added to the existing descriptors. These contracts may be published by corresponding ecosystem partners, and these transactions will be added into the various blockchains, and used for self-sovereign identity publication and full supply chain management (billing, life cycle management, scale-out/in, etc.). The new descriptors and extensions relate to the orchestrator and resource. In particular, as shown the orchestrator descriptor may contain information of the base element such as the ID, vendor, service contract ID, financial terms, etc . . . , a network services list (NS1, NS2 . . . NSn), SLA information (e.g. performance requirements, security requirements, bandwidth and latency requirements, transactions, etc . . . ) among others. The network services descriptor may include an extension for the orchestrator descriptor that includes, among others, the orchestrator descriptor ID, SLA parameters, financial terms, etc . . . The new resource descriptor may indicate the resource type (e.g., platform, rack, cpu, memory networking, storage), base element information (e.g., ID, vendor, resource parameters (e.g., IA, ISA, SGX, QAT, RDT, KPT, MK-TME), monitoring/telemetry details, IDs of the components, etc . . . , resource details (e.g., ID, parameters), network services ID, SLA parameters, financial terms, etc . . . .

Figure 7:
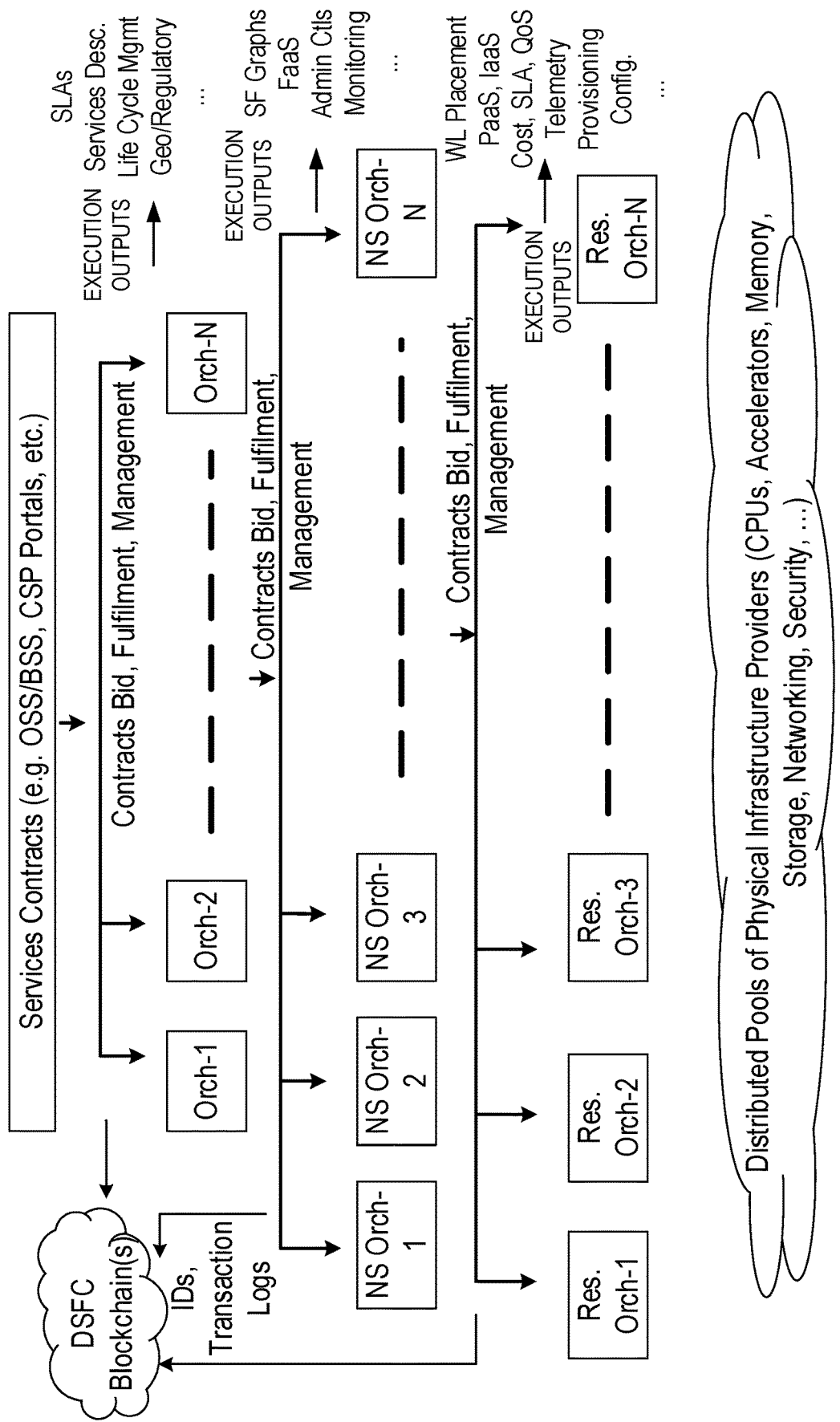
FIG. 7 illustrates a distributed and automated network services delivery for network function virtualization services, according to an example.

FIG. 7 illustrates a distributed and automated network services delivery for network function virtualization services. Specifically, this figure illustrates automated Delivery of NFV/SDN/5G Services, in a fully distributed architecture including multiple layers—operating as all autonomous and independent sub-systems.

In an example, Service Contracts can be originated by the Service Provider, extending functionality to traditional telecom providers and newer internet Service Provider entities getting into Content and Service delivery. These contracts are published into the blockchains, and orchestrated by one or more of the distributed, autonomous Orchestrators, which issue contracts which are onwards served by the Network Services Orchestrators (NS-Orch). And, likewise the Network Services contracts are serviced by the Resource Orchestrators. At each level, the next level contract and delivery is managed by the multiple blockchains (e.g., in the configuration identified in FIG. 4).

Figure 8:
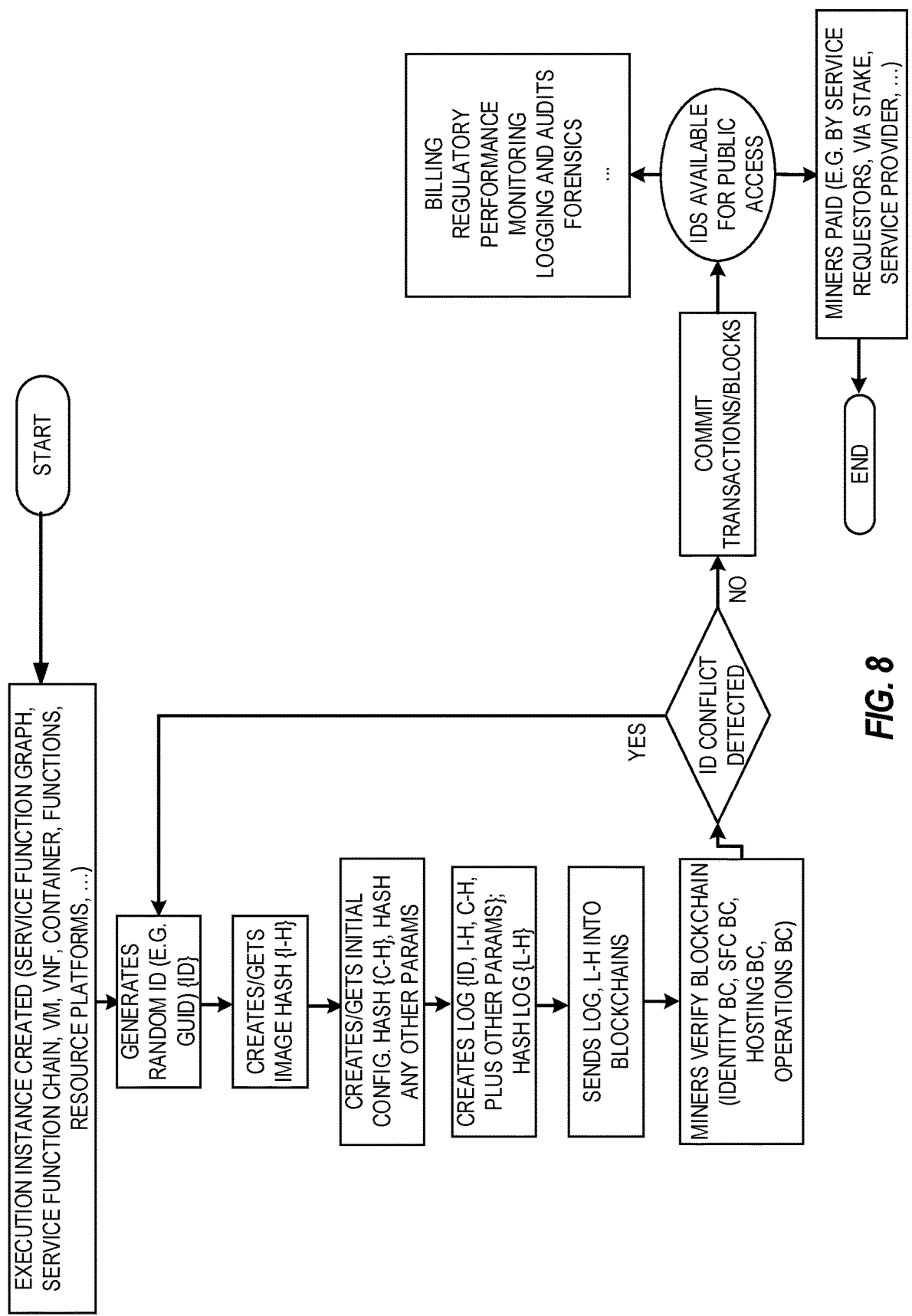
FIG. 8 illustrates a blockchain-based identity management flow, according to an example.

FIG. 8 illustrates an example blockchain-based identity management flow, used for identity creation and blockchain-based verification and recording into the identity blockchain (e.g., for an identity blockchain as illustrated and discussed with reference to FIG. 4). In an example, the method may include:

1. Creation of the instance of a Service, Service Function Chain, a VNF, a FaaS, a resource, a hardware enclave or virtualized partition, container, or any other component instance.

2. These instances create a self-generated identifier (e.g. a globally unique ID (GUID), or a random number) that together with the cryptographic hash of the instance, crypto-hash of the initial configuration and crypto-hash of the Identifier are together crypto-hashed and submitted for a blockchain processing operation.

3. The blockchain Miners verify each operation and in case of the identifier checks if the same Identity has not been previously submitted and accepted into the blockchain. In case of a conflict the operation is restarted.

4. Once adopted into the blockchain, the identity is available for public usages, including for Billing, Monitoring, Performance tracking, SLA enforcements, Regulatory purposes like Lawful Intercept and Data Protection, etc. Many more usages may also apply.

In an example, the flow of FIG. 8 may be adapted for managing or tracking the full life cycle of instances, including their time of creation, destruction, and use. This is useful for Scale-Out and Scale-In of services based on dynamic demand. Configuration Management of the instances—including tracking instance image updates, updates to the configuration (e.g. network hash tables, network policies, packet network route updates, etc.). This configuration is tied to the Identity of the instance.

In an example, the flow of FIG. 8 may also be applicable for tracking resource utilization and loading, including platform and hardware/silicon components such as CPUs, virtual CPUs, Memory (DIMMS, Intel 3DXP, etc.), Storage, Programmable and ASIC Accelerators (Deep Learning, Artificial Intelligence (AI), Field Programmable Gate Arrays (FPGAs), etc.), Network Accelerators (Intel Quick Assist Crypto Accelerator, Compression), and Key Protection and Security (Intel Key Protection Technology, Software Guard Extensions, Multi-Key Total Memory Encryption). The specific usages and time-of-use is managed as per the method flow.

Figure 9:
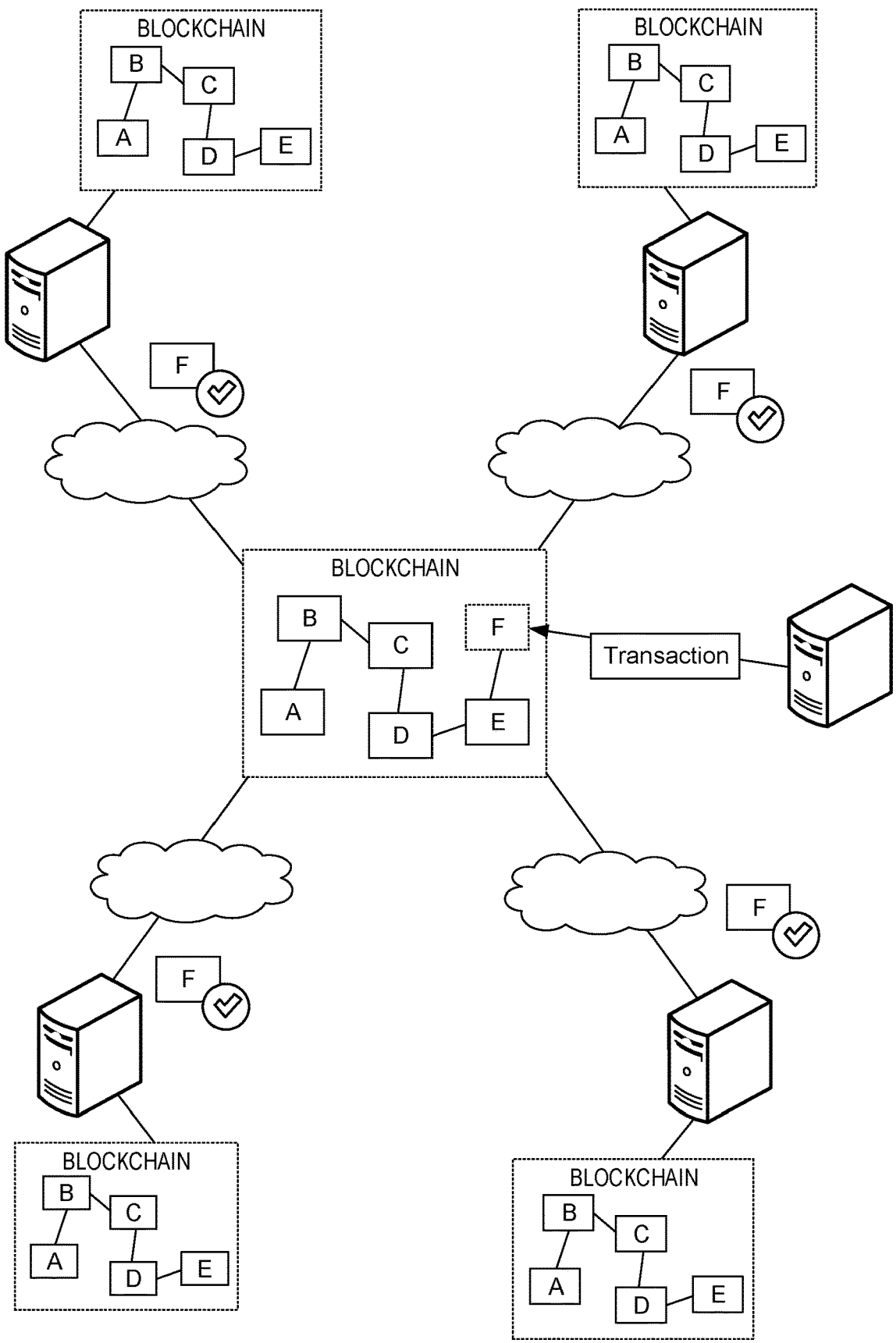
FIG. 9 illustrates a blockchain system implementation, according to an example.

FIG. 9 illustrates an example blockchain system implementation, usable with the presently disclosed techniques or with similar approaches. As is understood, a blockchain is a distributed database (e.g., distributed ledger) that maintains a growing list of data records that are hardened against tampering and revision. A blockchain includes "blocks," which hold data or both data and programs. Each block holds batches of individual "transactions" between blockchain participants. Each block includes a timestamp and linking information (usually a hash value) linking the current block to the previous block; the linking information allows traversal of the blockchain (in either direction).

Blockchain transactions are integrity protected using a distributed hashing algorithm that requires each transaction processor (e.g., "miner") to agree to the next block in the blockchain. Integrity is achieved through a consensus of multiple miners, each miner having access to its own copy of the ledger. If a majority of the miners agree on the contents of the ledger, then those agreed upon contents become the "truth" for the ledger; the miners that disagree will accept the truth of the majority (otherwise, they would not be able to function). Integrity is provable because an attacker would have to compromise a majority of miners and modify their copies of the ledger; this is extremely difficult (if not impossible).

In an example, the blockchain implementation may involve use transactions performed among participants to enable of zero knowledge commitments, and zero knowledge proof of knowledge of verification, using information written to the blockchain. Such techniques may allow enhanced privacy of data written to the blockchain in connection with NFV operations (e.g., to keep details of contracts or network participants secret). In an example, a zero knowledge proof applied in this scenario includes steps—(1) commitment of secret data to the blockchain, and (2) proof of knowledge of the secret data, using a cryptographic protocol.

As a specific example of a cryptographic protocol, to create proof of some information (such as an identifier m known by a new device), a new device may create a Pedersen's commitment of the form $M = g_1^m h_1^r$ where r is a random value chosen by the user and $g_1$ and $h_1$ are public parameters of the registrar. This commitment is enrolled at the blockchain. At enrollment the blockchain signs the commitment M to output $\sigma = M^\chi$ as the signature where $\chi$ is the secret key of the blockchain (such as a semi-permissioned blockchain such as ChainAnchor, which adds an identity and privacy-preserving layer above the blockchain.

In an example, Zero Knowledge Proof of Knowledge or Verification operates as follows. Let $\sigma_1, \sigma_2, \ldots, \sigma_t$ be the signatures corresponding to the identifiers that need to be proved by the device to the new device owner. At the time of registration the device aggregates the signatures into $$\sigma = \prod_{i=1}^{t} \sigma_i,$$

where $\sigma_i$ is the signature of committed value $$M_i = g_1^{m_i} h_1^{r_i}.$$

(Note—this can be just one signature if only one secret identifier has to be proven. But this may be generalized to a set of attributes for cases where the registration requires not only an identity but other attributes). These attributes are included as part of the zero knowledge proof to avoid information leakage while satisfying the registration consideration.

The new device then computes $$M = \prod_{i=1}^{t} M_i = g_1^{m_1 + \ldots + m_t} h_1^{r_1 + \ldots + r_t}.$$

The user sends $\sigma, M, M_i$, $1 \le i \le t$ to the verifier. As a next step the new device and the verifier carry out the following ZKPK protocol (where Greek letters denote quantities the knowledge of which is being proved, whereas all the other parameters are sent to the verifier):

$$PK\{(\alpha, \beta): M = g_1^\alpha h_1^\beta, \alpha, \beta \in Z_q\}$$

After the verifier accepts the zero-knowledge proof of the commitments, it checks if the following verifications succeed:

$$M = \prod_{i=1}^{t} M_i \text{ and } e(\sigma, g_2) = e(M, v)$$

where $g_2$ is a public parameter, v is the public key of the registrar and e is a bilinear mapping. If the last step succeeds then the verifier accepts the ZKPK of the signed commitments.

As above, every entity in an NFV and 5G system uses an identity. The entities themselves may be dynamic, i.e., instantiated, halted and closed on demand, or less dynamic, such as platforms, firmware, OSs, storage, networks. The entities may be software, firmware, hardware or combinations thereof. The entities may be services: network, orchestration, enterprise or sub-services. The entities may be sourced though multiple vendors, using a complex supply chain. The entities may be consumed by multiple consumers and billed in multiple ways. To employ the blockchain, in a first phase, the DSFC may capture the type and Quality of Service in an e-contract. The service contract may be created and published to the blockchain. In a second phase, DWH contracts that include VNFs may be automatically bid and matched per requirements. The contracts may be further processed by one or more of distributed Network Service Orchestrators and published into the blockchain. In a third phase, the DSFC and DWH contracts become operational and may be verified though system telemetry. The contracts may be further processed by one or more distributed Network Service Orchestrators and Resource orchestrators and published into blockchains. The contracts may be delivered, operated, managed, SLA'd, billed through the blockchains. At least 4 separate blockchains, or 1 with 4 distinct operational functions, may be used to facilitate safe, fair and reliable interactions between eco-system partners.

In various examples, the operations and functionality described herein may be embodied by an electronic device machine within which a set or sequence of instructions may be executed to cause the electronic processing system to perform any one of the methodologies discussed herein, according to an example embodiment. The machine may be a machine embodied by aspects of a personal computer (PC), a tablet PC, a personal digital assistant (PDA), a mobile telephone or smartphone, Internet of Things (IoT) device, network gateway, switch, or bridge, server or cluster-based system, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 10:
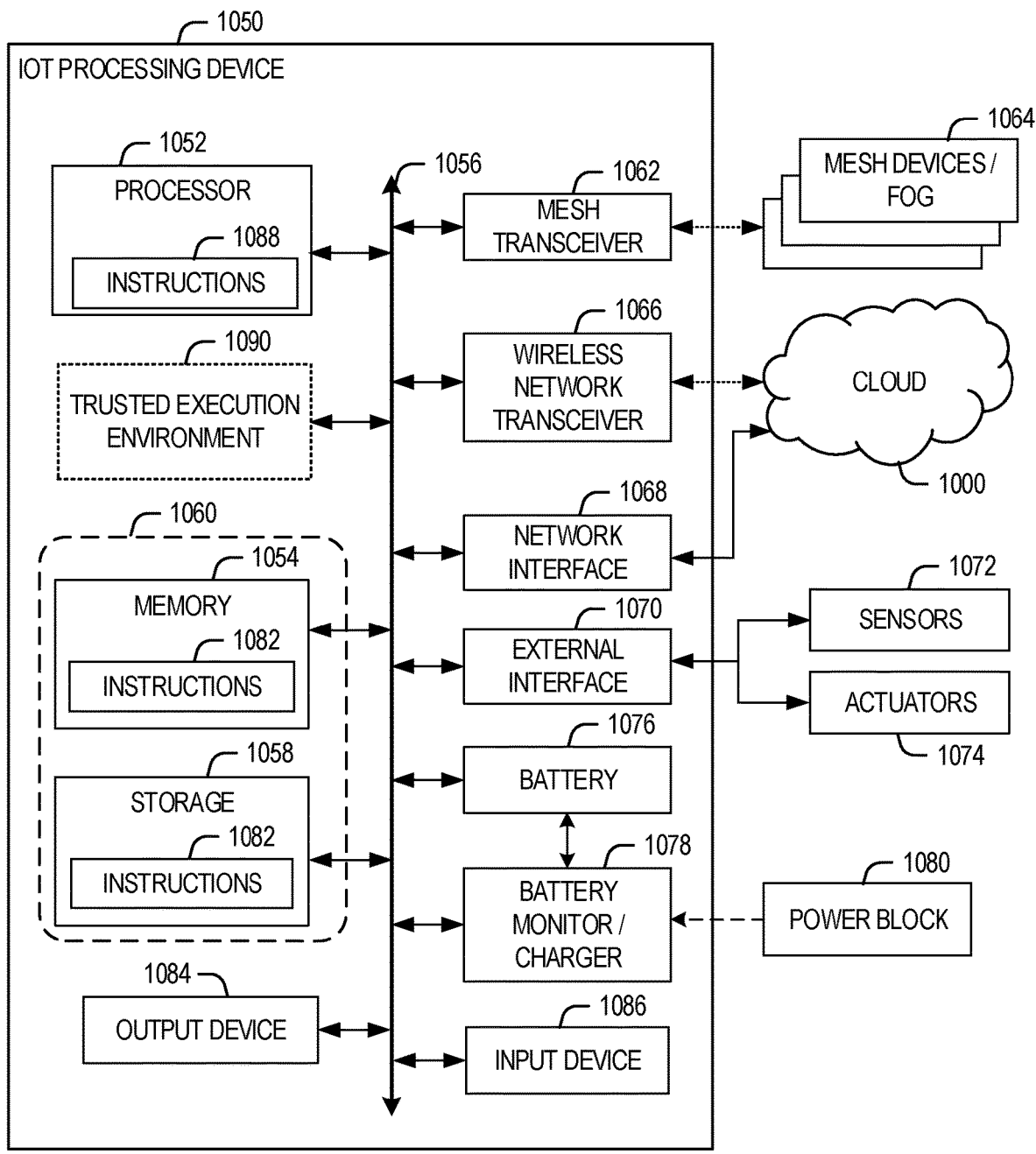
FIG. 10 is a block diagram of an example of components that may be present in a processing device, according to an example.

FIG. 10 is a block diagram of an example of components that may be present in a processing device 1050 for implementing the techniques described herein. The device 1050 may include any combinations of the components shown in the example or referenced in the disclosure above. The components may be implemented as ICs, portions thereof, discrete electronic devices, or other modules, logic, hardware, software, firmware, or a combination thereof adapted in the device 1050, or as components otherwise incorporated within a chassis of a larger system. Additionally, the block diagram of FIG. 10 is intended to depict a high-level view of components of the device 1050. However, some of the components shown may be omitted, additional components may be present, and different arrangement of the components shown may occur in other implementations.

The device 1050 may include a processor 1052, which may be a microprocessor, a multi-core processor, a multi-threaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a transceiver 1062, for communications with a cloud, fog, or mesh network devices 1064. The transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The transceiver 1062 may communicate using multiple standards or radios for communications at different range. For example, the device 1050 may communicate with close devices, e.g., within about 10 meters, using a local transceiver based on BLE, or another low power radio, to save power. More distant devices 1064, e.g., within about 50 meters, may be reached over ZigBee or other intermediate power radios. Both communications techniques may take place over a single radio at different power levels, or may take place over separate transceivers, for example, a local transceiver using BLE and a separate transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the device 1050 to actuators 1074, such as power switches, valve actuators, an audible sound generator, a visual warning device, and the like.

In some optional examples, various input/output (I/O) devices may be present within, or connected to, the device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the device 1050.

A battery 1076 may power the device 1050, although in examples in which the device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the device 1050. The processor 1052 may access the non-transitory, machine readable medium 1060 over the interconnect 1056. For instance, the non-transitory, machine readable medium 1060 may be embodied by devices described for the storage 1058 of FIG. 10 or may include specific storage units such as optical disks, flash drives, or any number of other hardware devices. The non-transitory, machine readable medium 1060 may further include, provide, or invoke instructions 1088 to direct the processor 1052 to perform a specific sequence or flow of actions, for example, as described with respect to the flowchart(s) and block diagram(s) of operations and functionality depicted above.

In an example, the instructions 1088 on the processor 1052 (separately, or in combination with the instructions 1088 of the machine readable medium 1060) may configure execution or operation of a trusted execution environment (TEE) 1090. In an example, the TEE 1090 operates as a protected area accessible to the processor 1052 to enable secure access to data and secure execution of instructions. Various implementations of the TEE 1090, and an accompanying secure area in the processor 1052 or the memory 1054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1050 through the TEE 1090 and the processor 1052.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 11:
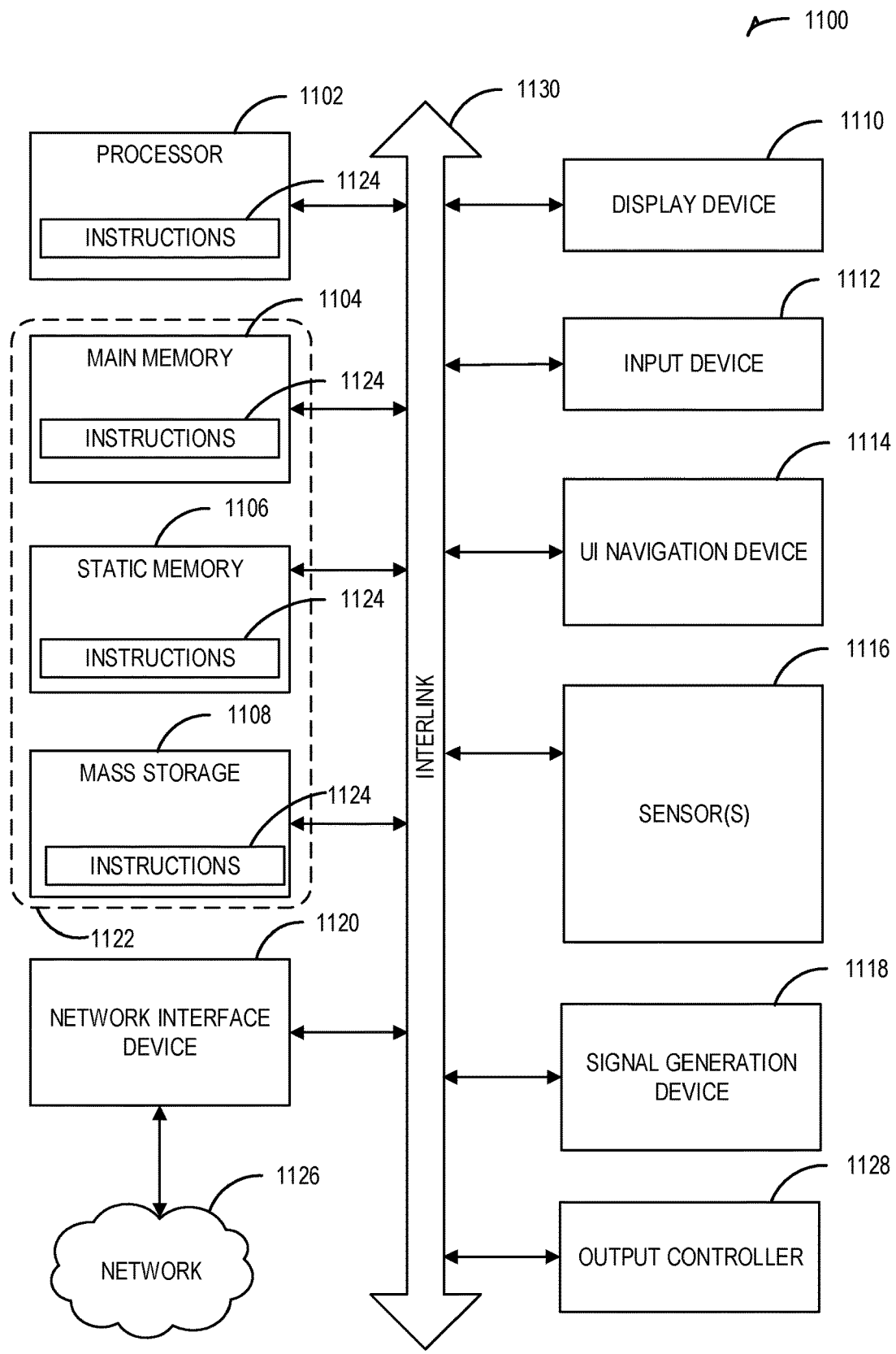
FIG. 11 is a block diagram illustrating an example of a machine upon which one or more embodiments may be implemented.

FIG. 11 illustrates a block diagram of an example of a machine upon which any one or more of the techniques (e.g., methodologies) discussed herein may perform. Examples, as described herein, may include, or may operate by, logic or a number of components, or mechanisms in the machine 1100. Circuitry (e.g., processing circuitry) is a collection of circuits implemented in tangible entities of the machine 1100 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, movable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1100 follow.

In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1100 may include a hardware processor 1102 (e.g., a central processing unit (CPU), a graphics processing unit (GPU), a hardware processor core, or any combination thereof), a main memory 1104, a static memory (e.g., memory or storage for firmware, microcode, a basic-input-output (BIOS), unified extensible firmware interface (UEFI), etc.) 1106, and mass storage 1108 (e.g., hard drive, tape drive, flash storage, or other block devices) some or all of which may communicate with each other via an interlink (e.g., bus) 1130. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1108, a signal generation device 1118 (e.g., a speaker), a network interface device 1120, and one or more sensors 1116, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1102, the main memory 1104, the static memory 1106, or the mass storage 1108 may be, or include, a machine readable medium 1122 on which is stored one or more sets of data structures or instructions 1124 (e.g., software) embodying or utilized by any one or more of the techniques or functions described herein. The instructions 1124 may also reside, completely or at least partially, within any of registers of the processor 1102, the main memory 1104, the static memory 1106, or the mass storage 1108 during execution thereof by the machine 1100. In an example, one or any combination of the hardware processor 1102, the main memory 1104, the static memory 1106, or the mass storage 1108 may constitute the machine readable media 1122. While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is a machine readable medium.

A machine readable medium may be provided by a storage device or other apparatus which is capable of hosting data in a non-transitory format. In an example, information stored or otherwise provided on a machine readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

Figure 12:
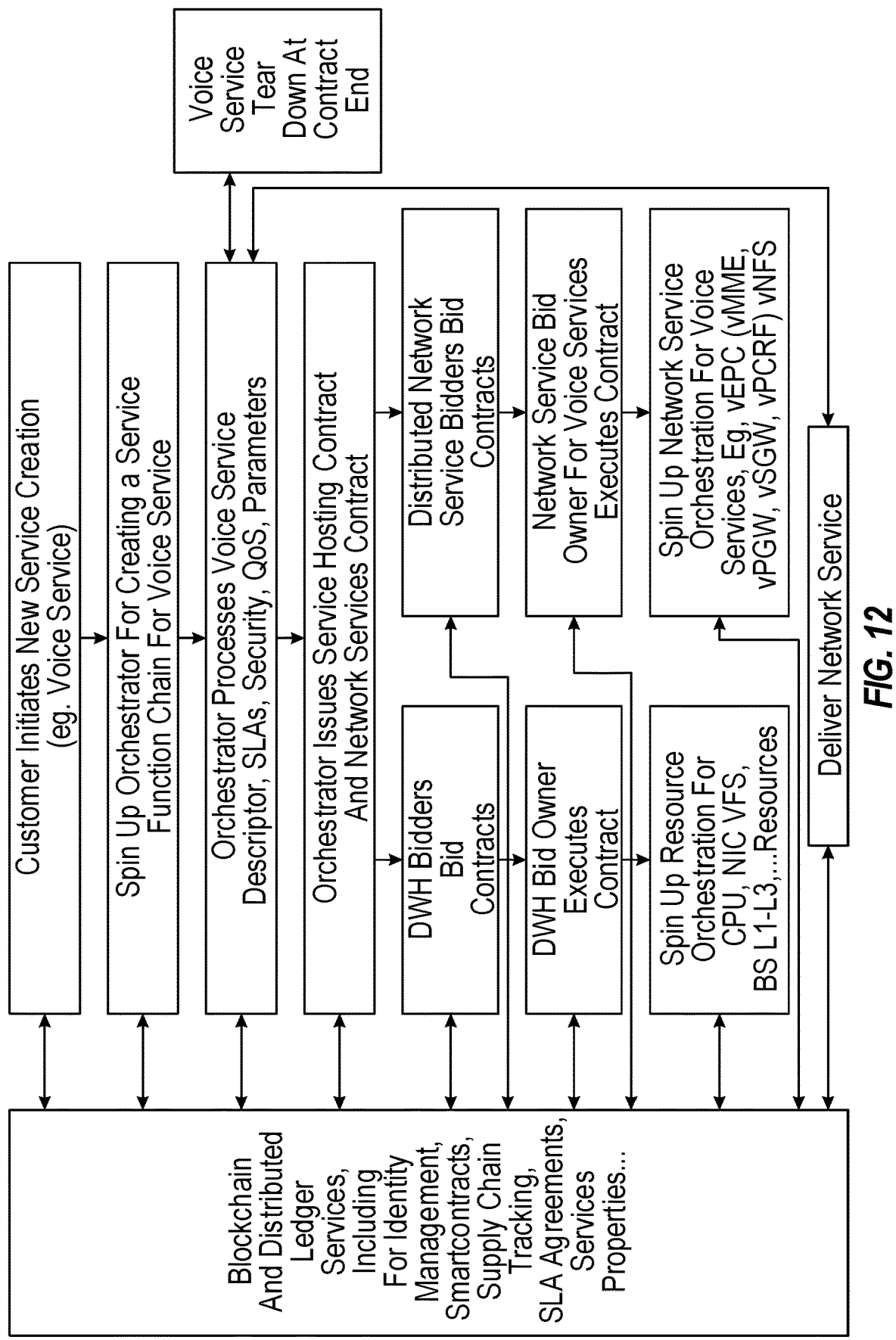
FIG. 12 is a block diagram illustrating an example of delivery of a telecom service, according to an example.

Thus, blockchain technology may be used to support network functionality as shown in FIG. 12. FIG. 12 is a block diagram illustrating an example of delivery of a telecom service, according to an example. An entity (customer) that desires to initiate a new service, such as a voice service, describes the desired service using a descriptor record. The customer signs the descriptor and contributes the descriptor to the blockchain. The descriptor may be provided via a descriptor message to a registry provider (registrar). A community of providers may vie to provide all or a portion of the service. The blockchain mining community ensures that the descriptor message actually was submitted, and that the registrar received the descriptor message. The mining community can replicate the registrar contents, making the descriptor message ubiquitously available to anyone who has access to a copy of the blockchain blocks. The registrar may send remuneration (e.g., an e-coin) to the customer in some embodiments or may second a portion of such remuneration (e.g., a fractional e-coin) to acknowledge receipt of the descriptor. For example, the contract is the descriptor for orchestration as a service, the customer is a user, and service providers are the orchestrator community.

Service providers looking to provide a service as defined by the descriptor may constantly monitor transactions to the registrar. For example, the service providers may inspect any miner's block chain transaction list. In essence, the blockchain may be used to implement a publish-subscribe mechanism.

Interested service providers may respond to the submitted descriptor by creating a bid record that is signed by the service provider and sent to the customer as a blockchain transaction. The customer acknowledges receipt of the bids by sending a portion of remuneration (e.g., a fractional e-coin) to each bidder (for bids under consideration). The customer may include a time frame for making a decision and/or the bidders can include a time frame for accepting a bid. The time frames may be different. If the time frames expire before a bid is accepted, the blockchain will record the passage of time and ensure clarity to an auditor about what the time frames were and whether the time frames expired.

The customer accepts a bid by signing the contract and sending the signed contract to the originator. The blockchain records the acceptance message was sent. The bidder acknowledges receipt of the acceptance by sending e-coin payment for winning the contract or a fractional e-coin if other terms of payment are defined. At this point, the blockchain knows the contract was accepted as well as the terms of the contract.

Thus, as shown in FIG. 12, blockchain technology can be applied at each step. Once the new network service (e.g., voice service) is requested, the orchestration provider is selected based on the descriptor for orchestration of a service. For DSFC, the orchestrator creates a service function chain for the voice service and processes a descriptor, SLAs, security, QoS and other parameters for the voice service. The orchestrator selects a voice service and agrees to an SLA for the voice service based on distributed service function chaining. The orchestrator then issues a service hosting contract and network servicing contract based on descriptor. In this case, the contract is the descriptor for a distributed service composed of a sequence/graph of Function as a Service functions. The customer may now be the orchestrator and the service providers are Edge Service Solution providers.

The various distributed entities bid on service hosting contract and network servicing contract. The orchestrator selects a set of providers that host discrete functions identified by the DSFC. For DWH, the contract is for a discrete network function (VNF, COTS, etc . . . ), the customer is the Edge Service Solution provider and service providers are the community of FaaS hosting providers.

The service is then executed in accordance with the SLA. In particular, the DWH is fulfilled by orchestration of the resources to be used, e.g., CPU, NIC, VFs, L1-L3 functionality of a base station. The network services is fulfilled by orchestration of the network services for the voice services, e.g., vEPC VNFs. The user then executes the service level agreement and receives the results of the distributed execution. The execution step may be monitored by a blockchain as FaaS nodes could record (audit) execution, supply telemetry data and/or accept/return an e-coin in acknowledgement for performing the service. The customer may thus begin using service supplied by the service provider. This may be conditional on the service provider supplying access rights, exposing service interfaces etc . . . This can happen on or off the blockchain. After the contract is fulfilled and the voice services delivered, the voice service may be eliminated.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

EXAMPLES

Example 1 is a device, comprising: processing circuitry arranged to: post a request for orchestration of a network service to be delivered using Network Function Virtualization (NFV), the bid posted using a Distributed Service Function Chain (DSFC) contract blockchain, wherein the device, DSFC contract, and initiator of a request for the network service are identified using a self-sovereign identity blockchain; determine, based on the DSFC contract blockchain, that the device is to orchestrate the network service from among entities that have indicated an ability to orchestrate the network service; identify, in response to a determination that the device is to orchestrate the network service, at least one entity to provide the network service from a DSFC Workload Hosting (DWH) contract blockchain that contains DWH contract bids of entities for the network service, wherein the entities and DWH contract are identified using the self-sovereign identity blockchain; and verify that the DWH contract is being executed by the at least one entity according to the DWH contract; and a memory configured to store the DWH contract.

In Example 2, the subject matter of Example 1 includes, wherein the processing circuitry is further arranged to verify that the at least one entity is provided remuneration for fulfilment of the DWH contract.

In Example 3, the subject matter of Examples 1-2 includes, wherein the processing circuitry is further arranged to create a service function chain for the network service.

In Example 4, the subject matter of Example 3 includes, wherein the processing circuitry is further arranged to verify, based on the service function chain, that the DWH contract is being executed by the at least one entity according to the DWH contract through collection of telemetry data that reports on one or more of: chain-of-custody compliance, regulatory compliance, service level agreement (SLA) compliance, quality of service (QoS) compliance, and security compliance.

In Example 5, the subject matter of Examples 1-4 includes, wherein the processing circuitry is further arranged to select the at least one entity to provide the network service from the DWH contract blockchain.

In Example 6, the subject matter of Examples 1-5 includes, wherein the network service comprises a virtual network function (VNF).

In Example 7, the subject matter of Example 6 includes, wherein the processing circuitry is further arranged to orchestrate a plurality of providers that host discrete functions to provide the VNF.

In Example 8, the subject matter of Examples 1-7 includes, wherein descriptors of entries in at least one of the self-sovereign identity blockchain, the DSFC contract blockchain or the DWH contract blockchain are defined in European Telecommunications Standards Institute (ETSI) NFV standards.

In Example 9, the subject matter of Examples 1-8 includes, wherein the processing circuitry is further arranged to generate a random self-generated identifier, hash the identifier with a cryptographic hash to form a crypto-hashed identifier, and submit the crypto-hashed identifier to the self-sovereign identity blockchain as a blockchain identifier of the device.

In Example 10, the subject matter of Examples 1-9 includes, wherein the DSFC contract contains a time frame for which the DSFC contract is valid.

In Example 11, the subject matter of Examples 1-10 includes, wherein the network service is a distributed network service and the processing circuitry is further arranged to issue, using the blockchain, the DWH contract and a network service contract for the distributed network service.

In Example 12, the subject matter of Examples 1-11 includes, wherein the self-sovereign identity blockchain, the DSFC blockchain, and the DWH blockchain are incorporated via a single distributed digital ledger.

Example 13 is a storage device including instructions, wherein the instructions, when executed by processing circuitry of a computing device, cause the processing circuitry to: post a request for orchestration of a network service using a Distributed Service Function Chain (DSFC) contract blockchain, wherein the computing device, DSFC contract, and initiator of a request for the network service are identified using a self-sovereign identity blockchain; in response to a determination using the DSFC contract blockchain that the computing device is to orchestrate the network service, create a service function chain for the network service for at least one entity to provide the network service based on a DSFC Workload Hosting (DWH) contract blockchain that contains DWH contract bids of entities for the network service, wherein the entities and DWH contract are identified using the self-sovereign identity blockchain; and verify that the DWH contract is being executed by the at least one entity according to the DWH.

In Example 14, the subject matter of Example 13 includes, wherein the instructions further cause the processing circuitry to verify, based on the service function chain, that the DWH contract is being executed by the at least one entity according to the DWH contract through collection of telemetry data that report on chain-of-custody compliance, regulatory compliance, service level agreement (SLA) compliance, quality of service (QoS) compliance, and security compliance.

In Example 15, the subject matter of Examples 13-14 includes, wherein the instructions further cause the processing circuitry to select the at least one entity to provide the network service from the DWH contract blockchain.

In Example 16, the subject matter of Examples 13-15 includes, wherein the network service comprises a virtual network function (VNF).

In Example 17, the subject matter of Example 16 includes, wherein the instructions further cause the processing circuitry to orchestrate a plurality of providers that host discrete functions to provide the VNF.

In Example 18, the subject matter of Examples 13-17 includes, wherein the instructions further cause the processing circuitry to generate a random self-generated identifier, hash the identifier with a cryptographic hash to form a crypto-hashed identifier and submit the crypto-hashed identifier to the self-sovereign identity blockchain as a blockchain identifier of the computing device.

In Example 19, the subject matter of Examples 13-18 includes, wherein the network service is a distributed network service and the instructions further cause the processing circuitry to issue, using the blockchain, the DWH contract and a network service contract for the distributed network service.

In Example 20, the subject matter of Examples 13-19 includes, wherein the self-sovereign identity blockchain, the DSFC blockchain, and the DWH blockchain are incorporated via a single distributed digital ledger.

Example 21 is a method of orchestrating a network service, comprising: selecting a network service to be delivered; selecting an orchestration provider for the network service using a self-sovereign identity blockchain to identify the orchestration provider and Distributed Service Function Chain (DSFC) contract blockchain to link the orchestration provider and the network service; creating a service function chain for the network service for at least one provider to host discrete functions identified by the DSFC based on a DSFC Workload Hosting (DWH) contract blockchain that contains DWH contract bids of providers for the network service, the DWH contract blockchain to link the providers and the functions; and executing the network service in accordance with a service level agreement (SLA) identified by the service function chain.

In Example 22, the subject matter of Example 21 includes, wherein the network service is to be delivered using Network Function Virtualization (NFV) and at least one of the functions is a virtual network function (VNF).

In Example 23, the subject matter of Example 22 includes, orchestrating a plurality of providers that host discrete functions to provide the VNF.

In Example 24, the subject matter of Examples 21-23 includes, collecting telemetry data and verifying, based on the service function chain and the telemetry data, that the DWH contract is being executed by the at least one entity according to the DWH contract, the telemetry data reporting on chain-of-custody compliance, regulatory compliance, service level agreement (SLA) compliance, quality of service (QoS) compliance, and security compliance.

In Example 25, the subject matter of Examples 21-24 includes, for each of the orchestration provider and the providers, generating a random self-generated identifier, hashing the identifier with a cryptographic hash to form a crypto-hashed identifier and submitting the crypto-hashed identifier to the self-sovereign identity blockchain as a blockchain identifier.

Example 26 is a device, comprising: means for selecting a network service to be delivered; means for selecting an orchestration provider for the network service using a self-sovereign identity blockchain to identify the orchestration provider and Distributed Service Function Chain (DSFC) contract blockchain to link the orchestration provider and the network service; means for creating a service function chain for the network service for at least one provider to host discrete functions identified by the DSFC based on a DSFC Workload Hosting (DWH) contract blockchain that contains DWH contract bids of providers for the network service, the DWH contract blockchain to link the providers and the functions; and means for executing the network service in accordance with a service level agreement (SLA) identified by the service function chain.

In Example 27, the subject matter of Example 26 includes, wherein the network service is to be delivered using Network Function Virtualization (NFV) and at least one of the functions is a virtual network function (VNF).

In Example 28, the subject matter of Example 27 includes, means for orchestrating a plurality of providers that host discrete functions to provide the VNF.

In Example 29, the subject matter of Examples 26-28 includes, means for collecting telemetry data and means for verifying, based on the service function chain and the telemetry data, that the DWH contract is being executed by the at least one entity according to the DWH contract, the telemetry data reporting on chain-of-custody compliance, regulatory compliance, service level agreement (SLA) compliance, quality of service (QoS) compliance, and security compliance.

In Example 30, the subject matter of Examples 26-29 includes, for each of the orchestration provider and the providers, means for generating a random self-generated identifier, hashing the identifier with a cryptographic hash to form a crypto-hashed identifier and submitting the crypto-hashed identifier to the self-sovereign identity blockchain as a blockchain identifier.

In Example 31, the subject matter of Examples 26-30 includes, wherein the self-sovereign identity blockchain, the DSFC blockchain, and the DWH blockchain are incorporated via a single distributed digital ledger.

Example 32 may include an apparatus comprising means to perform one or more elements of a method described in or related to any of examples 1-31, or any other method or process described herein.

Example 33 may include one or more non-transitory computer-readable media comprising instructions to cause an electronic device, upon execution of the instructions by one or more processors of the electronic device, to perform one or more elements of a method described in or related to any of examples 1-31, or any other method or process described herein.

Example 34 may include an apparatus comprising logic, modules, or circuitry to perform one or more elements of a method described in or related to any of examples 1-31, or any other method or process described herein.

Example 35 may include a method, technique, or process as described in or related to any of examples 1-31, or portions or parts thereof.

Example 36 may include an apparatus comprising: one or more processors and one or more computer readable media comprising instructions that, when executed by the one or more processors, cause the one or more processors to perform the method, techniques, or process as described in or related to any of examples 1-31, or portions thereof.

Example 37 may include a signal as described in or related to any of examples 1-31, or portions or parts thereof.

Example 38 may include a signal in a wireless network as described in or related to any of examples 1-31, or as otherwise shown and described herein.

Example 39 may include a method of communicating in a wireless network as described in or related to any of examples 1-31, or as otherwise shown and described herein.

Example 40 may include a system for providing wireless communication as described in or related to any of examples 1-31, or as otherwise shown and described herein.

Example 41 may include a device for providing wireless communication as described in or related to any of examples 1-31, or as otherwise shown and described herein.

Example 42 is a network comprising respective devices and device communication mediums for performing any of the operations of examples 1-31, or as otherwise shown and described herein.

Example 43 is an 4G/5G communications network topology, the network topology comprising respective communication links adapted to perform communications for the operations of any of examples 1-31, or as otherwise shown and described herein.

Example 44 is an edge cloud computing device implementation comprising processing nodes and computing units adapted for performing any of the operations of examples 1-31, or as otherwise shown and described herein.

Example 45 is an ETSI NFV system implementation comprising devices, processing nodes, and computing units adapted for performing any of the operations of examples 1-31, or as otherwise shown and described herein.

Example 46 is an edge cloud network platform comprising physical and logical computing resources adapted for performing any of the operations of examples 1-31, or as otherwise shown and described herein.

Example 47 is an apparatus comprising respective means for performing any of the operations of examples 1-31, or as otherwise shown and described herein.

Example 48 is a system to perform the operations of any of examples 1-31, or as otherwise shown and described herein.

Example 49 is at least one machine-readable storage medium, comprising information representative of instructions that, when executed by processing circuitry, cause the processing circuitry to, perform the operations of any of Examples 1-48.

In the above Detailed Description, various features may be grouped together to streamline the disclosure. However, the claims applicable to these features may not set forth every feature disclosed herein as embodiments may feature a subset of said features. Further, embodiments may include fewer features than those disclosed in a particular example.

What is claimed is:

1. A device, comprising:
   processing circuitry arranged to:
   post a request for orchestration of a network service to be delivered using Network Function Virtualization (NFV), the request posted using a Distributed Service Function Chain (DSFC) contract blockchain, wherein the device, DSFC contract, and initiator of a request for the network service are identified using a self-sovereign identity blockchain;
   determine, based on the DSFC contract blockchain, that the device is to orchestrate the network service from among entities that have indicated an ability to orchestrate the network service;
   identify, in response to a determination that the device is to orchestrate the network service, at least one entity to provide the network service from a DSFC Workload Hosting (DWH) contract blockchain that contains DWH contract bids of entities for the network service, wherein the entities and DWH contract are identified using the self-sovereign identity blockchain; and
   verify that the DWH contract is being executed by the at least one entity according to the DWH contract; and
   a memory configured to store the DWH contract.

2. The device of claim 1, wherein the processing circuitry is further arranged to verify that the at least one entity is provided remuneration for fulfilment of the DWH contract.

3. The device of claim 1, wherein the processing circuitry is further arranged to create a service function chain for the network service.

4. The device of claim 3, wherein the processing circuitry is further arranged to verify, based on the service function chain, that the DWH contract is being executed by the at least one entity according to the DWH contract through collection of telemetry data that reports on one or more of: chain-of-custody compliance, regulatory compliance, service level agreement (SLA) compliance, quality of service (QoS) compliance, and security compliance.

5. The device of claim 1, wherein the processing circuitry is further arranged to select the at least one entity to provide the network service from the DWH contract blockchain.

6. The device of claim 1, wherein the network service comprises a virtual network function (VNF).

7. The device of claim 6, wherein the processing circuitry is further arranged to orchestrate a plurality of providers that host discrete functions to provide the VNF.

8. The device of claim 1, wherein descriptors of entries in at least one of the self-sovereign identity blockchain, the DSFC contract blockchain or the DWH contract blockchain are defined in European Telecommunications Standards Institute (ETSI) NFV standards.

9. The device of claim 8, wherein the descriptors include an orchestrator descriptor, a resource descriptor, and a network services descriptor, and the network services descriptor comprises an orchestrator descriptor identity, service level agreement (SLA) parameters and financial terms.

10. The device of claim 1, wherein the processing circuitry is further arranged to generate a random self-generated identifier, hash the identifier with a cryptographic hash to form a crypto-hashed identifier, and submit the crypto-hashed identifier to the self-sovereign identity blockchain as a blockchain identifier of the device.

11. The device of claim 1, wherein the DSFC contract contains a time frame for which the DSFC contract is valid.

12. The device of claim 1, wherein the network service is a distributed network service and the processing circuitry is further arranged to issue, using the blockchain, the DWH contract and a network service contract for the distributed network service.

13. The device of claim 1, wherein the self-sovereign identity blockchain, the DSFC blockchain, and the DWH blockchain are incorporated via a single distributed digital ledger.

14. A storage device including instructions, wherein the instructions, when executed by processing circuitry of a computing device, cause the processing circuitry to:
   post a request for orchestration of a network service using a Distributed Service Function Chain (DSFC) contract blockchain, wherein the computing device, DSFC contract, and initiator of a request for the network service are identified using a self-sovereign identity blockchain;
   in response to a determination using the DSFC contract blockchain that the computing device is to orchestrate the network service, create a service function chain for the network service for at least one entity to provide the network service based on a DSFC Workload Hosting (DWH) contract blockchain that contains DWH contract bids of entities for the network service, wherein the entities and DWH contract are identified using the self-sovereign identity blockchain; and
   verify that the DWH contract is being executed by the at least one entity according to the DWH.

15. The storage device of claim 14, wherein the instructions further cause the processing circuitry to verify, based on the service function chain, that the DWH contract is being executed by the at least one entity according to the DWH contract through collection of telemetry data that report on chain-of-custody compliance, regulatory compliance, service level agreement (SLA) compliance, quality of service (QoS) compliance, and security compliance.

16. The storage device of claim 14, wherein the instructions further cause the processing circuitry to select the at least one entity to provide the network service from the DWH contract blockchain.

17. The storage device of claim 14, wherein the network service comprises a virtual network function (VNF) and the instructions further cause the processing circuitry to orchestrate a plurality of providers that host discrete functions to provide the VNF.

18. The storage device of claim 14, wherein the instructions further cause the processing circuitry to generate a random self-generated identifier, hash the identifier with a cryptographic hash to form a crypto-hashed identifier and submit the crypto-hashed identifier to the self-sovereign identity blockchain as a blockchain identifier of the computing device.

19. The storage device of claim 14, wherein the network service is a distributed network service and the instructions further cause the processing circuitry to issue, using the blockchain, the DWH contract and a network service contract for the distributed network service.

20. The storage device of claim 14, wherein the self-sovereign identity blockchain, the DSFC blockchain, and the DWH blockchain are incorporated via a single distributed digital ledger.

21. A method of orchestrating a network service, comprising:

selecting a network service to be delivered;

selecting an orchestration provider for the network service using a self-sovereign identity blockchain to identify the orchestration provider and Distributed Service Function Chain (DSFC) contract blockchain to link the orchestration provider and the network service;

creating a service function chain for the network service for at least one provider to host discrete functions identified by the DSFC based on a DSFC Workload Hosting (DWH) contract blockchain that contains DWH contract bids of providers for the network service, the DWH contract blockchain to link the providers and the functions; and executing the network service in accordance with a service level agreement (SLA) identified by the service function chain.

22. The method of claim 21, wherein the network service is to be delivered using Network Function Virtualization (NFV) and at least one of the functions is a virtual network function (VNF).

23. The method of claim 22, further comprising orchestrating a plurality of providers that host discrete functions to provide the VNF.

24. The method of claim 21, further comprising collecting telemetry data and verifying, based on the service function chain and the telemetry data, that the DWH contract is being executed by at least one entity according to the DWH contract, the telemetry data reporting on chain-of-custody compliance, regulatory compliance, service level agreement (SLA) compliance, quality of service (QoS) compliance, and security compliance.

25. The method of claim 21, further comprising, for each of the orchestration provider and the providers, generating a random self-generated identifier, hashing the identifier with a cryptographic hash to form a crypto-hashed identifier and submitting the crypto-hashed identifier to the self-sovereign identity blockchain as a blockchain identifier.

* * * * *